United States Patent
Coyer et al.

(10) Patent No.: US 10,901,757 B1
(45) Date of Patent: Jan. 26, 2021

(54) SYSTEM AND METHOD FOR ASSISTING AN AGENT DURING A CLIENT INTERACTION

(71) Applicant: West Corporation, Omaha, NE (US)

(72) Inventors: Daniel A. Coyer, Dunedin, FL (US);
Ryan L. Techlin, Hortonville, WI (US);
Jeremy T. Tellock, Appleton, WI (US);
Dennis C. White, Arvada, CO (US);
Shelley A. Wildenberg, Crivitz, WI (US)

(73) Assignee: WEST CORPORATION, Omaha, NE (US)

( * ) Notice: Subject to any disclaimer, the term of this patent is extended or adjusted under 35 U.S.C. 154(b) by 127 days.

(21) Appl. No.: 16/116,589

(22) Filed: Aug. 29, 2018

(51) Int. Cl.
*G06F 17/30* (2006.01)
*G06F 9/451* (2018.01)
*G10L 15/08* (2006.01)
*G06F 3/16* (2006.01)
*G06F 16/33* (2019.01)
*G06F 16/9535* (2019.01)
*G10L 15/22* (2006.01)

(52) U.S. Cl.
CPC .............. *G06F 9/451* (2018.02); *G06F 3/167* (2013.01); *G06F 16/3334* (2019.01); *G06F 16/9535* (2019.01); *G10L 15/08* (2013.01); *G10L 15/22* (2013.01); *G10L 2015/088* (2013.01); *G10L 2015/223* (2013.01)

(58) Field of Classification Search
CPC .................................. G06F 17/30; G06F 9/451
See application file for complete search history.

(56) References Cited

U.S. PATENT DOCUMENTS

| | | | | |
|---|---|---|---|---|
| 6,157,707 | A * | 12/2000 | Baulier | H04W 12/0605 379/189 |
| 8,311,874 | B2 * | 11/2012 | Gupta | G06Q 30/0205 705/7.29 |
| 9,232,373 | B1 * | 1/2016 | Caldwell | H04L 51/02 |
| 2013/0124515 | A1 * | 5/2013 | Ghimire | G06F 16/248 707/728 |
| 2016/0117644 | A1 * | 4/2016 | Harsch | G06Q 10/1095 705/7.19 |
| 2016/0217128 | A1 * | 7/2016 | Baum | G06F 40/284 |

* cited by examiner

*Primary Examiner* — Andrea C Leggett

(57) ABSTRACT

A computing system, method and non-transitory computer readable memory are provided, to assist an agent during a client interaction between the agent and a client over a communications channel. An agent station may generate a graphic user interface (GUI) of the client interaction during the client interaction, the GUI displaying a current identified keyword and one or more interaction phases, each interaction phase having a respective current phase score for the client interaction. A keyword and associated keyword information from the client interaction may be received, including phase and corresponding phase score information, and the GUI updated with the currently identified keyword and newly received phase information accounting for the received corresponding phase score information.

20 Claims, 11 Drawing Sheets

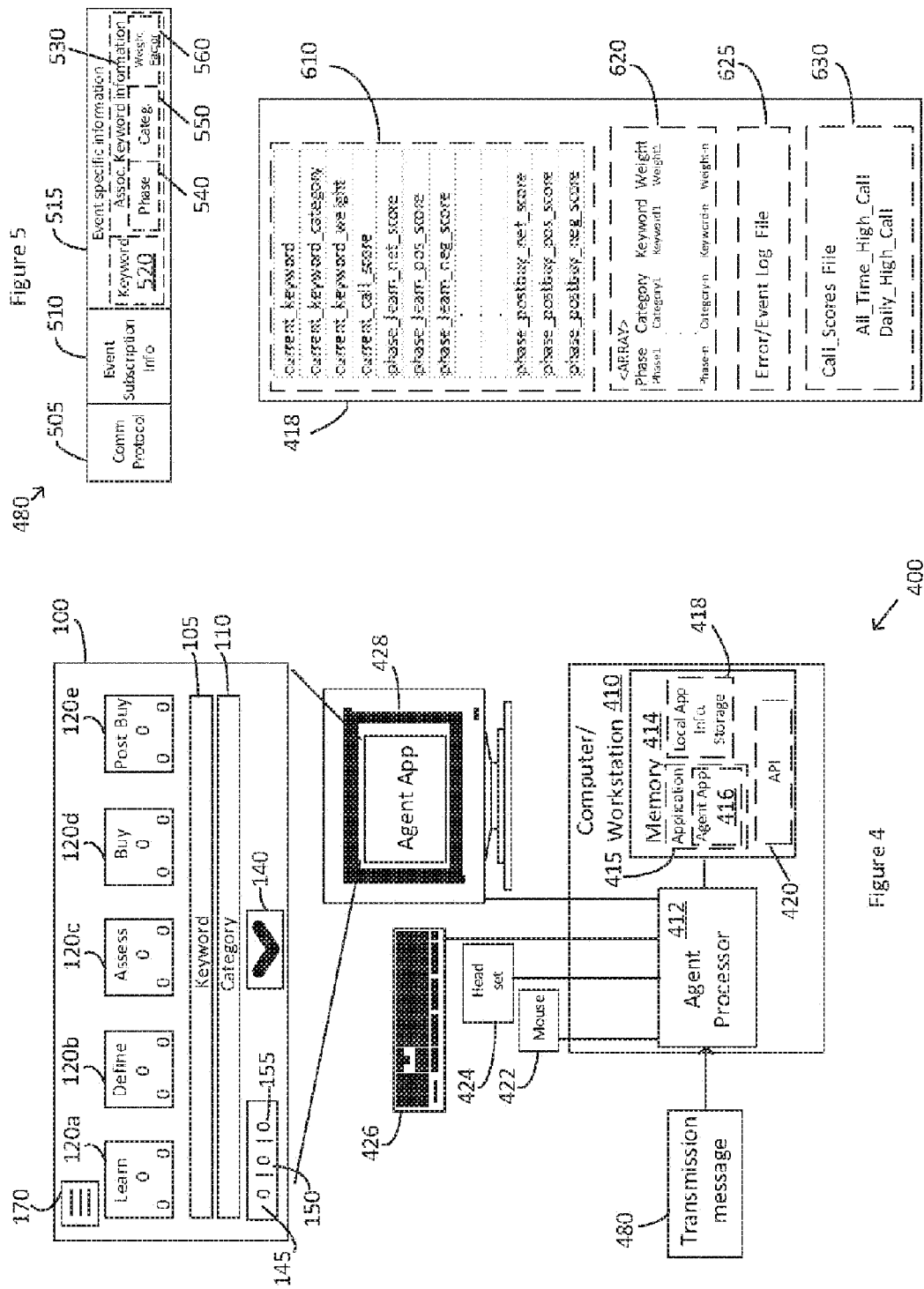

| Keyword Phase | Keyword Category | Keyword /phrase | Keyword Score |
|---|---|---|---|
| Learn | Introduction | calling on behalf of Company A | 1 |
| Learn | Engage Customer | on a recorded line | 1 |
| Learn | Engage Customer | provide you with any assistance | 1 |
| Define | Determine the Customer's Needs | do you have any questions about | 2 |
| Define | Determine the Customer's Needs | just checking in | -2 |
| Assess | Develop appropriate solutions | <Feature 1> | 3 |
| Assess | Demonstrate Brand Value | <Advantage x> | 3 |
| Buy | Initiate Customer Solutions | thank you for your order | 4 |
| Post Buy | <Category X> | thank you for choosing | 5 |

Figure 11

| Keyword Phase | Keyword Category | Keyword /phrase | Keyword Score | Date/Time |
|---|---|---|---|---|
| Learn | Introduction | calling on behalf of Company A | 1 | 20180312 13:42:05.003 |
| Learn | Engage Customer | on a recorded line | 1 | 20180312 13:42:25.807 |
| Define | Determine the Customer's Needs | do you have any questions about | 2 | 20180312 13:43:03.140 |
| Learn | Engage Customer | provide you with any assistance | 1 | 20180312 13:43:45.622 |
| Define | Determine the Customer's Needs | just checking in | -2 | 20180312 13:45:51.434 |
| Assess | Develop appropriate solutions | <Feature 6> | 3 | 20180312 13:48:15.778 |
| Assess | Demonstrate Brand Value | <Advantage x> | 3 | 20180312 13:50:37.256 |
| Buy | Initiate Customer Solutions | thank you for your order | 4 | 20180312 13:54:21.943 |
| Post Buy | <Category x> | thank you for choosing | 5 | 20180312 13:56:30.323 |

Figure 13

SYSTEM AND METHOD FOR ASSISTING AN AGENT DURING A CLIENT INTERACTION

TECHNICAL FIELD

This disclosure is directed to customer interactions, and more particularly, to providing a system, method and application that assists an agent during a client interaction.

BACKGROUND ART

Companies utilize agents in interactions with clients, for example, to provide customer support or assist in sales. Such agents often interact with clients/customers using a voice channel, for example, a telephone landline or a voice over IP (VoIP) channel, or a mobile telephone.

Companies typically provide agents with a script or guidance sheet to use during client communications, to assist the agent in answering questions, or to guide in addressing various topics to be discussed during the communication. For example, an agent may utilize a guidance sheet that provides information as to topics to address while on a call with the client. However, it becomes difficult for an agent to make a determination as to which topics have already been addressed, and to what degree, especially where the call jumps around, for example, by a client asking questions or seeking information that is in a topic not yet discussed.

This application is directed to overcoming one or more of the problems discussed above.

SUMMARY OF THE APPLICATION

In one example embodiment, provided is a computing system for assisting an agent during a client interaction between the agent and a client over a communications channel. The computing system includes an agent station having an agent processor configured to perform one or more of generate a graphic user interface of the client interaction on an agent display during the client interaction, the graphic user interface to display a current identified keyword and one or more interaction phases, each interaction phase having a respective current phase score for the client interaction. The agent processor is further configured to perform one or more of receive a keyword and associated keyword information from the client interaction, the associated keyword information including an associated interaction phase and corresponding current phase score. The agent processor is further configured to perform one or more of update the current identified keyword of the graphic user interface with the received keyword, and the current phase score of the graphic user interface that corresponds to the received associated interaction phase with the received corresponding current phase score, during the client interaction.

In another example embodiment, a method of assisting an agent during a client interaction over a communications channel, comprises one or more of providing a GUI of the client interaction on an agent display during the client interaction, the GUI displaying a current identified keyword and one or more interaction phases, each interaction phase having a respective current phase score for the client interaction. An agent station performs one or more of receiving at an agent station a keyword and associated keyword information, the associated keyword information including an associated interaction phase and associated current phase score. The agent station performs one or more of updating the current identified keyword of the graphic user interface with the received keyword, and the current phase score of the graphic user interface that corresponds to the received associated interaction phase with the received corresponding current phase score, during the client interaction.

In yet another example embodiment, a non-transitory computer readable medium having stored therein program instructions that when executed cause a computer to perform one or more of providing a GUI of the client interaction on an agent display during the client interaction, the GUI displaying a current identified keyword and one or more interaction phases, each interaction phase having a respective current phase score for the client interaction. The computer performs one or more of receiving a keyword and associated keyword information, the associated keyword information including an associated interaction phase and associated current phase score. The computer performs one or more of updating the current identified keyword of the graphic user interface with the received keyword, and the current phase score of the graphic user interface that corresponds to the received associated interaction phase with the received corresponding current phase score, during the client interaction.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 4 is a computer system that may be utilized in assisting an agent during a client interaction, in accordance with an embodiment of the application;

FIG. 5 shows an exemplary transmission message that may be utilized to provide information to the agent station when assisting an agent during a client interaction, in accordance with an embodiment of the application;

FIG. 6 illustrates an exemplary structure and format for the information storage 418 of FIG. 4, in accordance with embodiments of the application;

FIG. 11 illustrates a client keyword database that may be utilized in assisting an agent during a client interaction, in accordance with an embodiment of the application;

FIG. 13 illustrates a representative call log file that may be generated as the keywords of the client keyword database file of FIG. 11 are identified, in accordance with an embodiment of the application;

DETAILED DESCRIPTION

Figure 1:
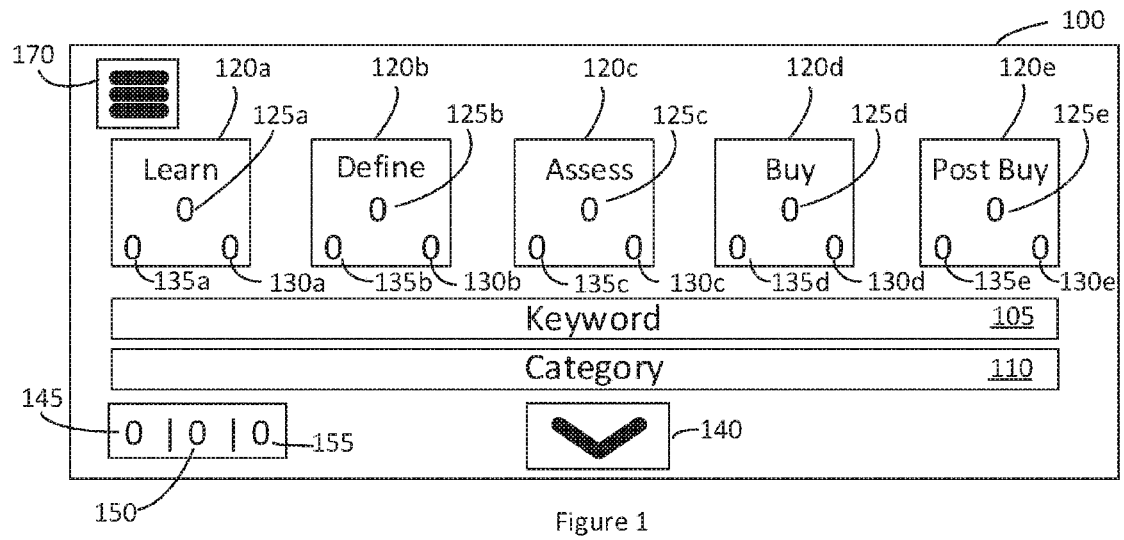
FIG. 1 illustrates an exemplary graphic user interface (GUI) 100 that may be used to assist and agent during a client interaction, in accordance with an embodiment of the application.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of the selected embodiments.

The features, structures, or characteristics as described throughout this specification may be combined in any suitable manner throughout the embodiment, In addition, the usage of phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrase "example embodiments", "in some embodiments", "in other embodiments", or similar language, may be used to refer to the same group of embodiments, and other described features, structures, or characteristics may be combined in any suitable manner in one or more embodiments.

In addition, while the term "message" may be used in description of embodiments, the application may be applied to many types of network data, such as, packet, frame, datagram, etc. The term "message" or "request" may include packet, frame, datagram, or any equivalents thereof. Furthermore, while certain types of messages and signaling requests may be depicted in example embodiments, they are not limited to a certain type of message, and the application is not limited to a certain type of signaling.

A system, method and non-transitory computer readable memory are provided for assisting an agent during a client interaction. A graphic user interface (GUI) may be provided. Information may be received during a client interaction, including a keyword and keyword associated information including a phase and weighting factor corresponding to the keyword. The graphic user interface may be updated with the keyword and keyword associated information, thereby assisting the agent during the client interaction.

Having the keyword and associated key associated information including associated phase and weighting factor, allows an agent application to provide metrics such as phase scores, and current keyword and category, to be displayed for an agent through a single and intuitive GUI. The agent can readily assess call phases and respective phase scores, and keywords and associated keyword information utilized during the interaction, substantially in real time, as the interaction progresses. Thus, the agent is able to determine which phases and topics of an interaction have been adequately addressed, through the keyword and associated information displayed, as well through the scores provided for each phase of the interaction. Where a client asks a question or otherwise directs the interaction to topics not currently being addressed, the agent may quickly and readily reascertain the appropriate phase of the interaction and/or topics to explore after responding to the client's question or concern.

FIG. 1 illustrates an exemplary GUI 100 that may be used to assist and agent during a client interaction, in accordance with an embodiment of the application. The GUI 100 may be provided, for example, by an agent application running on an agent workstation, as will be discussed below beginning with FIG. 4.

As shown in FIG. 1, the current identified keyword portion 105 may display a current keyword of a client interaction (i.e., a voice call), and a current keyword category portion 110 may be utilized to display a category associated with the current keyword. A keyword as used herein may be a single word, or instead may be multiple words used together that form a phrase. GUI 100 further includes interaction phase portions 120a-120e that may be used to display information for interaction phases of a client interaction. Interaction phases may be various stages that a customer interaction goes through in addressing the client's needs. For example, interaction phase portion 120a may provide information for a 'Learn' phase defining the portion of an interaction where the agent introduces him/her self and engages the client. An interaction phase 120b is shown, for example, for a 'Define' portion, where the agent may determine the client's needs for that interaction. Interaction phase 120c is shown for an 'Assess' interaction phase, where the agent may develop appropriate solutions for the client. An interaction phase portion 120d for a 'Buy' interaction phase may show information for the agent with regards to sales of a particular product or service to the client, and an interaction phase 120e for a 'Post Buy' portion is shown providing information about events or issues arising after the client purchases a product or service.

Interaction phase portions 120a-120e each include respective current phase scores 125a-125e that provide a current score for the respective interaction phase. The interaction phase portions 120a-120e further include respective total positive phase scores 130a-130e, and respective total negative scores 135a-135e. Determination of the current phase scores 125a-125e, total positive phase scores 130a-130e, and total negative phase scores 135a-135e will be discussed in detail below beginning at FIG. 7B. Briefly, the positive score values 130a-130e for a phase provides an indication of how many positive keywords or phrases that were identified for that particular call phase, that the agent is encouraged to use during that phase. The negative score values 135*a*-135*e* of a phase provides an indication to the agent how many keywords or phrases were identified that the agent is discouraged to use during that particular phase of the interaction. The current phase scores 125*a*-125*e* of a phase is a sum of the positive keyword score less the negative keyword score for the particular phase.

The GUI 100 further includes a keyword expansion button 140 that when selected, displays a keyword list portion, for example, all keywords and associated keyword information like the keyword phrase, category, and respective score, that have been used in the current client interaction. The keyword list portion will be discussed below with respect to the GUI of FIG. 2. Further shown in the GUI 100 is a current call score 145 for displaying the current score of the current client interaction, a daily high score 150 for displaying the score for the client interaction with the highest score that day, and an all-time high score 155 for displaying the score for the client interaction with the all-time high score since the agent application providing the GUI 100 was first used. A menu button 170 provides agent application options to an agent when selected. In addition, a right-click within the GUI 100 will cause a mini-mode, or compact display mode, to be displayed. The menu and the compact display mode will be discussed below with respect to FIG. 3.

Figure 2:
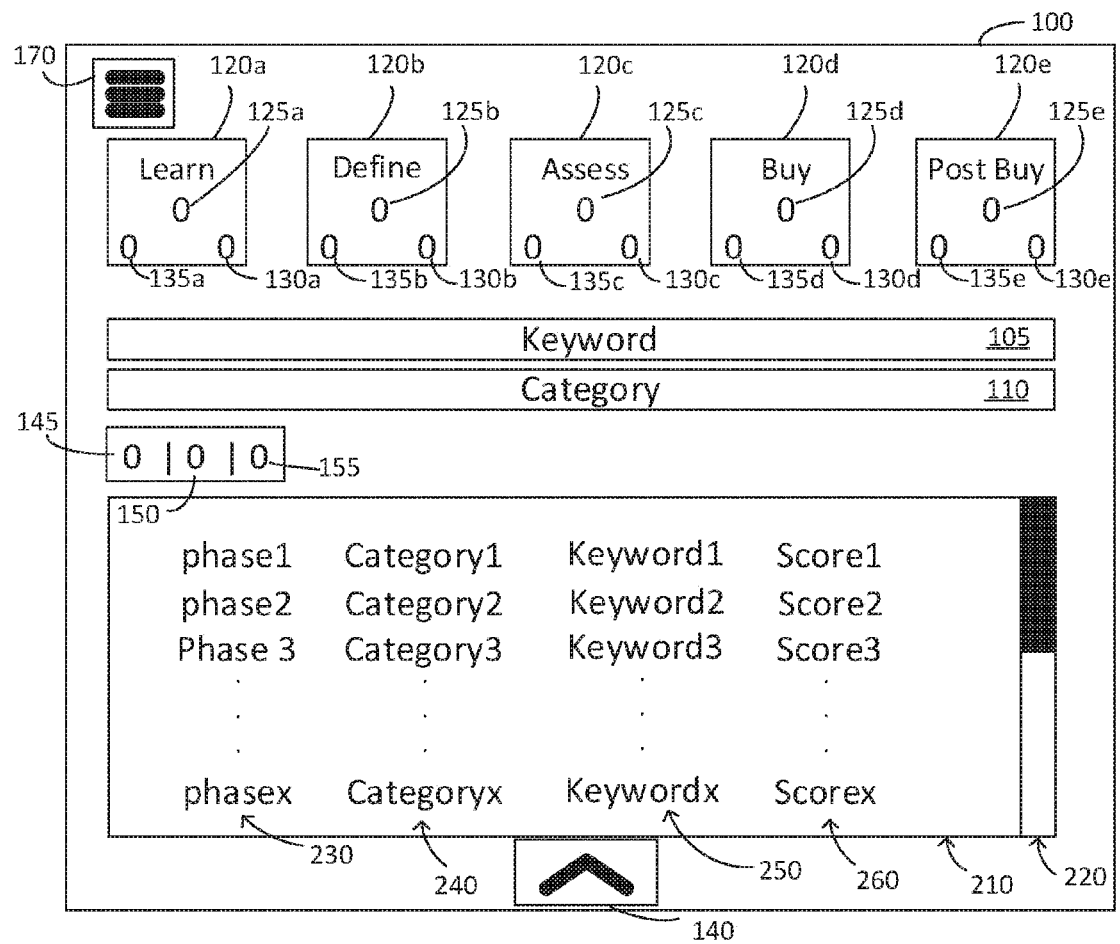
FIG. 2 illustrates the alteration of the GUI 100 of FIG. 1, upon selection of the keyword expansion button 140, in accordance with an embodiment of the application.

FIG. 2 illustrates the alteration of the GUI 100, upon selection of the keyword expansion button 140, in accordance with an embodiment of the application. Elements of FIG. 2 having reference numerals that have been previously used may operate in a similar fashion and will not be discussed in detail.

Upon selection of the keyword expansion button 140, a keyword list portion 210 is displayed in the GUI 100. If the keyword list portion 210 is longer than what will display within the list portion area of the GUI, a scroll bar 220 may be utilized to scroll through the keyword list portion 210.

The keyword list portion 210 may display keywords used during a current client interaction, as well associated keyword information such as one or more of an associated phase, category and weighting factor (i.e., shown as the score) for the keyword. As shown in the keyword list portion 210, a phase column 230, category column 240 and weighting factor (score) column 260 provides respective call phase, category and score information for a respective keyword or phrase of the keyword column 250 that have been utilized during a client interaction. As shown, the selection of the keyword list button 140 will collapse the keyword list 210 back to the GUI 100 shown in FIG. 1.

Figure 3:
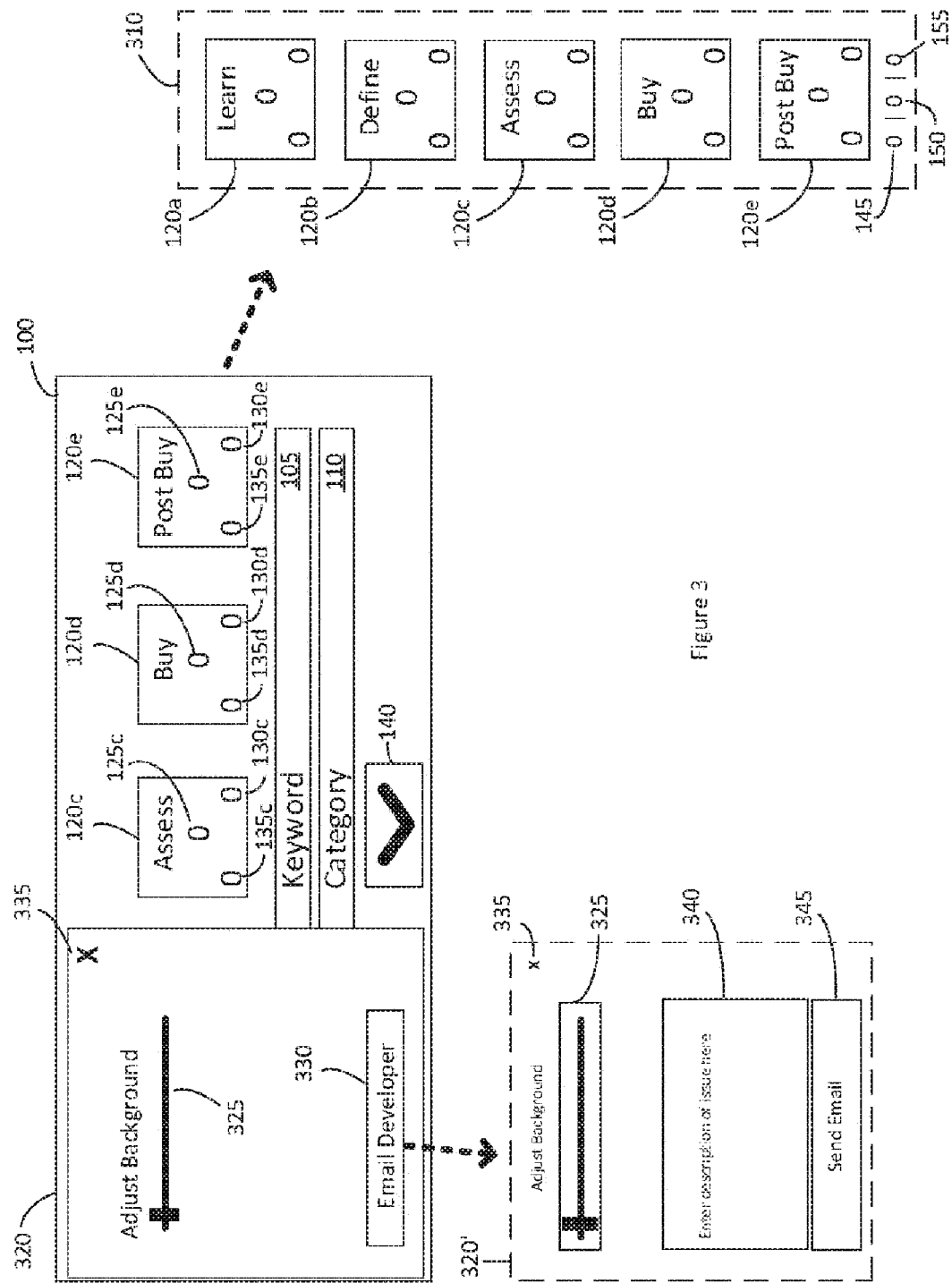
FIG. 3 illustrates the GUI 100 of FIG. 1, upon detection of a right-click within the GUI 100, or selection of the menu button 170, in accordance with an embodiment of the application.

FIG. 3 illustrates the GUI 100 of FIG. 1, upon detection of a right-click within the GUI 100, or selection of the menu button 170, in accordance with embodiments of the application. Elements of FIG. 3 having reference numbers previously discussed may operate in a similar fashion and will not be discussed in detail.

When a mouse right-click is detected within the GUI 100, the GUI 100 may be replaced by a compact mode GUI 310. The compact mode GUI 310 may include the interaction phase information portions 120*a*-120*e* that provide respective current score information for the various call phases, as described above with respect to FIG. 1. Further, the compact mode GUI 310 may include the current call score 145, a high score 150 and an all time high score 155, as described above with respect to FIG. 1. To exit the compact mode display, a user may right-click anywhere within the compact mode display 310, thereby replacing the compact mode GUI 310 with the GUI 100.

Upon selection of the menu button 170, an expanded menu 320 is provided. The expanded menu 320 may be superimposed over the GUI 100, as shown in FIG. 3. Instead, the expanded menu 320 may be displayed adjacent to the GUI 100.

The expanded menu 320 may include a background color slider 325, allowing background colors to be adjusted for the GUI, for example, altering the intensity and/or brightness of the GUI. Further, an email developer button 330 may be provided, allowing an agent using the agent application providing the GUI 100 to enter a description of an issue that is desired to be addressed. Further, an exit menu button icon 335 may be provided, where selection of the exit menu icon closes the expanded menu, returning the display back to the state as shown in FIG. 1, where the menu button 170 is displayed.

Upon selection of the e-mail developer button 330, the expanded menu 320 is altered to an expanded e-mail display 320' providing an e-mail dialog box 340, where the agent may enter the description of the issue that needs addressing. A send email button 345 may be provided, that when selected, sends the dialog entered into the dialog box 340 to the developer (or some other party with an interest to the issue addressed in the e-mail dialog box) as an e-mail message. The e-mail message may be addressed, for example, from the particular agent station running the agent application that provides the GUI 100. The email may include (i.e., as an appended file) a screen shot of the GUI 100 at the time the e-mail is sent (i.e., the screenshot provided as if the expanded menu 320 were not being displayed). The e-mail may further include (i.e., as an appended file) an error/event log file, including errors generated by the application, as well as events occurring while the application is running (i.e., indicating application start, telephony log in, keyword utterance events with associated keyword information, telephony log out, application close, etc. . . . ). Thus, it will be appreciated that the agent application is capable of detecting at least certain errors during its operation, and maintaining information regarding events that occur while the application is running. Upon sending the e-mail by selection of the send email button 345, the expanded e-mail menu 320' dialog interaction box 340 collapses, returning the GUI 100 to the displaying the expanded menu 320. Though the expanded e-mail display 320' is shown adjacent the other portions of the GUI 100 for simplicity purposes, typically, the expanded e-mail display 320' would replace the expanded menu 320 upon selection of the e-mail developer button 330.

The GUI 100 described with respect to FIGS. 1-3 may include color-coding. For example, each interaction phase 120*a*-120*e* may have a heading that is provided a specific color, for easy identification for the agent. The keyword list 210 may be coordinated to the specific phase colors. For example, referring to FIG. 2, rows of the keyword list may be color-coded for the color of the phase of the phase column 230. Further, where the current identified keyword displayed at keyword 105 is associated with a positive-valued weighting factor, the keyword displayed at 105 and associated category 110 may be color-coded in green. Where the current identified keyword displayed at keyword 105 is associated with a negative-valued associated weighting factor, the keyword displayed at 105 and associated category 110 may be color-coded in red.

FIG. 4 is a computer system that may be utilized in assisting an agent during a client interaction, in accordance with an embodiment of the application. Elements of FIG. 4 having reference numerals already discussed may operate in a similar fashion and will not be discussed in detail.

As shown in FIG. 4, an agent workstation 410 may include an agent processor 412 coupled with a memory 414. The memory 414 may include an application portion 415 for storing applications, programs, etc. . . . used at the agent station, including the agent application 416. The agent application 416 is able to receive information about a client interaction, process the information, and generate/update on a display 428 the GUI 100 that may assist the agent during the client interaction. The memory 414 may further include a local app information storage portion 418 that may be utilized to store information for applications running at the agent workstation 410, for example, the agent application 416, and an application interface (API) portion 420. The API portion 420 may include, for example, software libraries, instructional code, or other files utilized by the agent processor 412 in processing information received at the agent station 410 about a client interaction, and allowing the processor to provide that information to applications running on the application portion 415, including the agent application 416 providing the GUI 100.

The agent workstation 410 may be coupled with input devices, allowing information to be entered for the agent workstation 410. For example, a mouse 422, headset 424 and/or keyboard 426 may be provided. Further, the display 428 may be provided, thereby allowing the agent workstation 410 to display applications operating thereon, including the agent application 416 providing the GUI 100.

As shown, a transmission message 480 may provide information about a client interaction that may be processed by the agent application 416 in providing the GUI 100. The processor may be any processor having the capabilities of running the agent application 416 and for utilizing the communication protocol(s) used to process the transmission message 480. The memory 414 may be any combination of volatile and non-volatile memory, including for example, RAM, ROM, hard disk, flash drive, etc. . . . for storing the applications including the agent application 416, providing any information storage 418 for the applications, and for providing any sufficient API 420. Operation of the system of FIG. 4 in providing assistance to an agent during a client communication, will be discussed below beginning with the flowchart of FIG. 7.

FIG. 5 shows an exemplary transmission message 480 that may be utilized to provide information to the agent application 416 when assisting an agent during a client interaction, in accordance with an embodiment of the application. As shown in FIG. 5, the transmission message 480 may include some communications protocol packaging 505 (or multiple layers thereof), in a protocol and arrangement understood by the agent workstation 410. For example, the API 420 of the workstation 410 of FIG. 4 may include as part of a software library or other files or instructional code, libraries and/or files for interpreting and parsing the information provided via the communications protocol 505 used for the transmission message 480. The transmission message 480 may further include event subscription information 510, providing information about an event to which the agent workstation was subscribed to that triggered the transmission message 480. The transmission message may further include event specific information portion 515, that provides information to the agent workstation related to the event of the event subscription information 510. The event specific information 515, may include, for example, a current identified keyword (or keyphrase) portion 520, and a keyword associated information portion 530 where the event subscription information indicated a keyword was identified. The keyword associated information portion 530 may include a phase portion 540, a category portion 550 and a weighting factor portion 560 as shown in FIG. 5, that correspond with the keyword 520.

Though the transmission message 480 is shown as a single packet/message, it will be appreciated that the information contained therein may be transmitted over multiple packets or messages, depending on the particular communications standards and APIs being employed at the agent workstation 410. The event specific information 515 may be left out of a transmission if the event subscription information 510 is sufficient for the communication to the agent workstation. For example, the agent workstation 410 may be subscribed to receive an event indication when a client interaction is initiated. The reception of the transmission message 480, in one or more messages, indicating the communications protocol 505 and the event subscription information 510 that signifies that a client interaction has begun may thus be sufficient for the transmission message 480 without the need to communicate any event specific information 515.

FIG. 6 illustrates an exemplary structure and format for the information storage 418 of FIG. 4, in accordance with an embodiment of the application. The structure and format of FIG. 6 illustrates the various information, such as variables, arrays, databases and/or files that may be utilized by the agent application 416 in providing the GUI 100. As shown in FIG. 6, a variable portion 610 may include variables for storing information such as the current keyword, current keyword category, current weighting factor, and a current call score identified during a client interaction. Variable portion 610 may further include the net score, positive score and negative score information variables for the various phases of a client interaction. The local app information storage 418 may further include an array or database portion 620 that stores keyword and associated keyword information that has been previously utilized during the client interaction. An Error/Event Log File portion 625 may store an error/event log file that logs errors and events generated by the application, for example, as a text file. The error/event log file may automatically be appended to an email sent, for example, using the Email Developer Button 330 as discussed above with respect to FIG. 3. Further, a call scores portion 630 may be provided, for example, storing an all time call high score and a daily call high score.

The variable and array portions 610, 620, may be stored as a single file as individual files, and/or as blocks of allocated memory of the information storage portion 418. The information storage portion 418 may be located in RAM, ROM, a hard disk, a flash drive or other removable storage media, or some combination thereof. The call scores file 630 may be, for example, any file(s), may be encrypted, and that provides access to all time high score information and daily high call score information for different client interactions that have occurred using the agent application 416 over a single day or multiple days.

The variable portion 610, array/database portion 620 and error/event log file 625 may be defined and/or allocated upon each initiation of the agent application 416. Initially, the variables of variable portion 610 and arrays and/or databases of array/database portion 620 may be initialized to zero. The variables of variable portion 610 and arrays/ databases of array/database portion 620 may then be populated by the agent application 416 during a client interaction, for use in providing, updating and maintaining the GUI 100. Further, upon initiation of a client interaction, the values for any variables 610 and arrays/databases 620 may be zeroed out, and the error/event log 625 initialized, thereby preparing the agent application 416 for the particular client interaction. In contrast, the call scores file(s) of call scores files portion 630 may be maintained indefinitely, and used to display the all time call high score and the daily high call score across multiple client interactions.

Though the variable portion 610 and array portion 620 show specific information stored therein, such information may instead be maintained in a different fashion for the local application information storage portion 418. For example, the phase scoring for each phase, instead of being maintained as individual variables of the variable portion 610, may instead be maintained with an array at array portion 620.

Figures 7A, 7B:
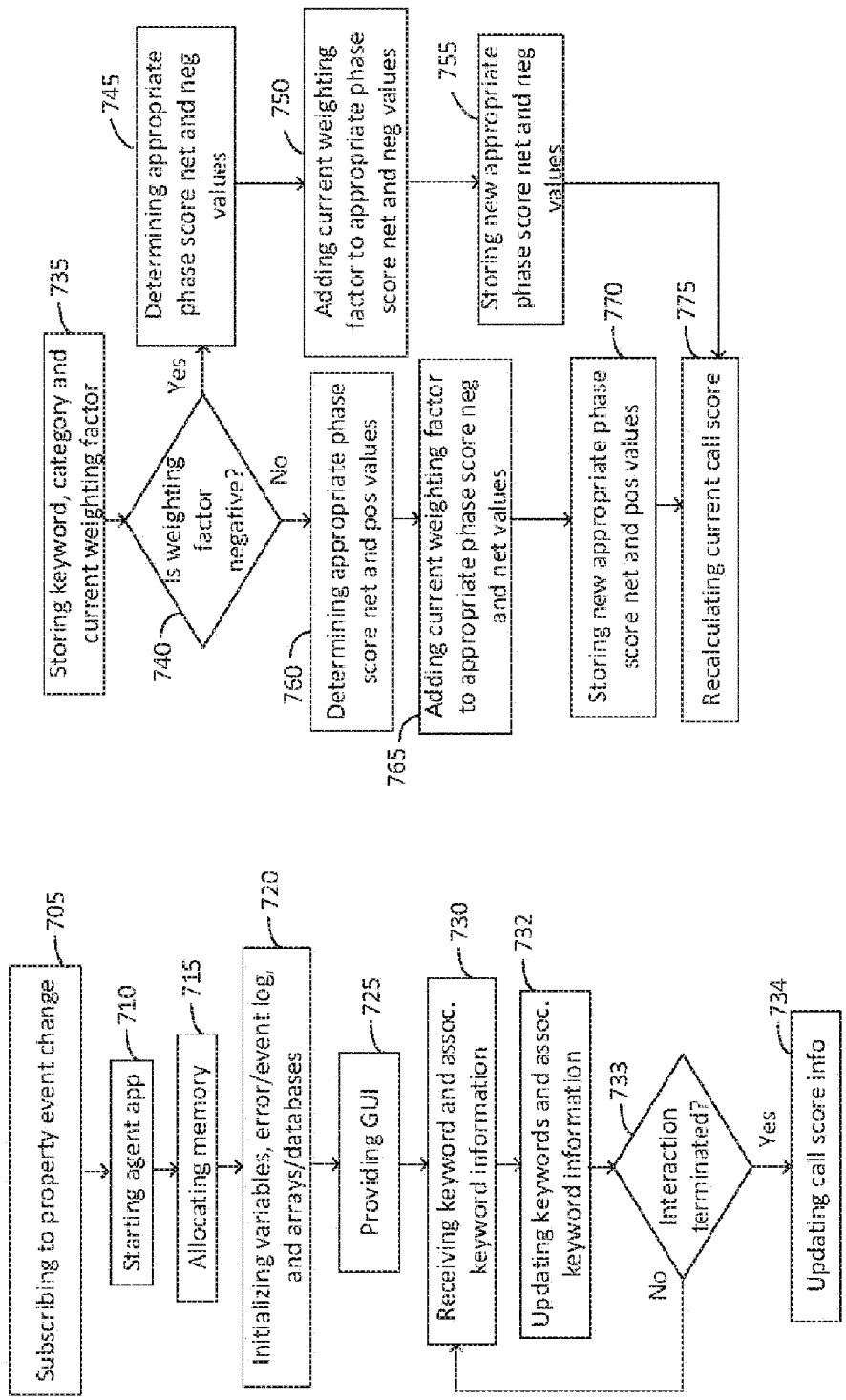
FIG. 7A is a flowchart illustrating the operation of the system of FIG. 4, in accordance with an embodiment of the application.
FIG. 7B is a flowchart illustrating the determining of phase scoring, in accordance with an embodiment of the application.

FIG. 7A is a flowchart illustrating the operation of the system of FIG. 4 for assisting an agent during a client interaction, in accordance with an embodiment of the application. FIG. 7A will be discussed with respect to the GUI 100 of FIGS. 1-3, the system of FIG. 4 and exemplary data structures of FIGS. 5-6. As shown at step 705, the agent workstation subscribes to property change events. The agent workstation 410, when powered up, may utilize the API of API 420 that allows for subscribing to events that may occur at other devices within a network to which the agent workstation 410 is in communication. Thus, an API of API 420 may cause the agent workstation 410 to subscribe to property change events related to a client interaction, including a call connected event, a keyword identified event, a call disconnected event, etc. . . . . . At step 710, the agent application is started. This may occur, for example, automatically when the agent workstation 410 is powered-up. In the alternative, an agent utilizing the workstation 410 may select the agent application 416 to run on the workstation, for example, using the mouse 422 or the keyboard 426. The agent application may instead automatically start/open upon receipt of a client interaction, like a voice call, at the agent station.

Memory is then allocated, as shown at step 715. This may occur, for example, with the variables of variable portion 610 and array/databases of array/database portion 620 being allocated in the memory 414. As shown at step 720, the variables, the error/event log, and arrays/databases are initialized. For example, the values for the variables of the variable portion 610 and the arrays/databases of array/database portion may all be set to zero, thereby preparing the agent application 716 for the new client interaction indicated by a call initiated subscription property event attribute change being received at the agent workstation. The error/event log file 625 may be initialized, preparing it for the current client interaction.

As shown at step 725, the GUI may be provided, for example, the GUI 100, at the display 428 of the agent station 410. The GUI may include, for example, the current identified keyword, category, as well as one or more phases of a client interaction, where each phase may display a score for that respective phase. Further, providing the GUI at step 720 may include populating a daily high score and an all-time high call score 150, 155 with the corresponding values from the call scores file 630.

As shown at step 730, a keyword and associated keyword information is received, for example, via the transmission message 480 at the agent station 410. For example, during a client interaction, a keyword (or phrase) may be identified as having been spoken by the agent through a property event attribute change to an agent keyword identified subscription event. The property change event for a keyword spoken triggers the sending of the transmission message 480. An attribute changed event may be executed, that provides the transmission message bundling the event specific information 515 as keyword 520 and keyword associated information 530 including phase 540, category 550 and weighting factor 560 associated with the keyword 520. The agent station detects the attribute property change, to the events for which it is subscribed, for example, an event attribute property change indicated within the transmission message 480.

Keyword and associated keyword information is updated for the GUI 100 as shown at step 732. Phase scores, for example, current, positive and/or negative phase scores, are calculated for use in updating the GUI 100. Determination of the current, positive and negative call phase scores will be discussed below with respect to FIG. 7B. It will be appreciated that in some embodiments, the phase score calculation may be carried out at the agent workstation. In other embodiments, the phase scores for each phase may be determined at some other device, for example, a server in communication with the agent workstation, as will be described further below with respect to FIG. 9, where the call score information such as current, positive and negative phase score information is transmitted as variables within the event specific information 515 of the transmission message 480 in a predetermined format. In this later embodiment, the call score information like the current, positive and/or negative phase score information is received at the agent station as part of the receiving 730.

The updating 732 may occur, for example, by taking the received keyword and associated keyword information from portions 520 and 530 of the transmission message 480, and updating an array (or database) of array portion 620 with the keyword and associated keyword information. Thus, an agent, when expanding the keyword list expansion button 140 of the GUI 100, may be provided the keyword list 210 as shown in FIG. 2 using the values from the array. It is then determined at step 733 whether the client interaction is terminated. This may be detected, for example, by receiving an indication in a transmission message 480 to the agent station 410 of a changed property event attribute for a subscribed call termination event, that the client interaction has ended. At this time, the call score file of the call score files portion 630 may be updated at step 734, for example, by replacing values in one or both of the daily_high_call and all_time_high_call files with the value of the current_call_score variable of variable portion 610 for the client interaction, where the current_call_score value is greater than one or both of the daily_high_call and all_time_high_call values. In one embodiment, the call scores file may be maintained and the call scores determined at the agent workstation. In another embodiment, the call score file portion 630 may be maintained and the call scores calculated at some other device, for example, a server in communication with the agent station, as described below with respect to step 975 of FIG. 9.

FIG. 7B is a flowchart illustrating determining current, positive and negative phase scores, in accordance with an embodiment of the application. FIG. 7B will be discussed with respect to the GUI 100 of FIGS. 1-3, the system of FIG. 4 and exemplary data structures of FIGS. 5-6. FIG. 7B will be discussed where the current, positive and negative phase scores are being determined at the agent station. Below, with respect to FIG. 9, FIG. 7B will be discussed in the context of the current, positive and negative phase scores being determined at some other device, for example, a server in communication with the agent workstation. It is contemplated that the determining of the current, positive and negative phase scores as described below with respect to FIG. 9 may also occur for the system of FIG. 4 by some outside device, for example, a server in communication with the agent workstation.

As shown at step 735, the keyword and keyword associated information is stored. Where the phase score is determined at the agent workstation, this may be accomplished where upon receipt of the transmission message, the agent processor 412 uses the API 420 to parse the keyword portion 520 and keyword associated information portion 530 from the transmission message 480, accounting for an appropriate communications protocol(s) 505. The agent processor 410 may then pass the information on to the agent application 416. The agent application may store the keyword 520 in the current_keyword variable location of the variable portion 610, and the category 550 in the current_keyword_category variable location of the variable portion 610. The weighting factor value 550 may then be stored in the current_keyword_weight variable.

It may be determined at step 740 whether the weighting factor has a negative value, as shown at step 740. Where the weighting factor value has a negative value, an appropriate phase score for the net and neg score values is determined at step 745. For example, where the phase portion 540 indicates that the associated phase for the keyword 520 is the 'learn' phase, the appropriate phase values may be determined by retrieving the phase_learn_net_score and the phase_learn_neg_score values from the variable portion 610. At step 750, the current weighting factor is added to the appropriate phase score net and neg score values determined at step 745. For example, for the 'learn' phase example mentioned above, the value of the weighting factor 550 is added to each of the phase_learn_net_score and the phase_learn_neg_score values. At step 755, the newly calculated values for the appropriate phase net and neg scores are stored back into the variables. For example, the newly calculated values for the net and neg values calculated accounting for the weighting value associated with the learn phase are stored back into the phase_learn_net_score and the phase_learn_neg_score variables of the variable portion 620. The current call score value is then recalculated as shown at step 775, for example, by retrieving the current call score value from the current_call_score variable of variable portion 610, adding the value of the weighting factor value to the current call score value, and storing the newly calculated call score value back into the current_call_score variable of variable portion 610.

Returning to step 740, where it is determined that the weighting factor value is not negative, appropriate phase score net and pos values are determined at step 760. This determining occurs in a similar fashion as the determining of step 745. The current weighting factor value is added to the appropriate phase net and pos scores identified at step 760, as shown at step 765, in a similar fashion as discussed with respect to step 750. The newly calculated appropriate phase score net and pos values are then stored at step 770 in a similar fashion as the storing of step 755, and flow continues to step 775 where the current call score is recalculated.

Figure 8:
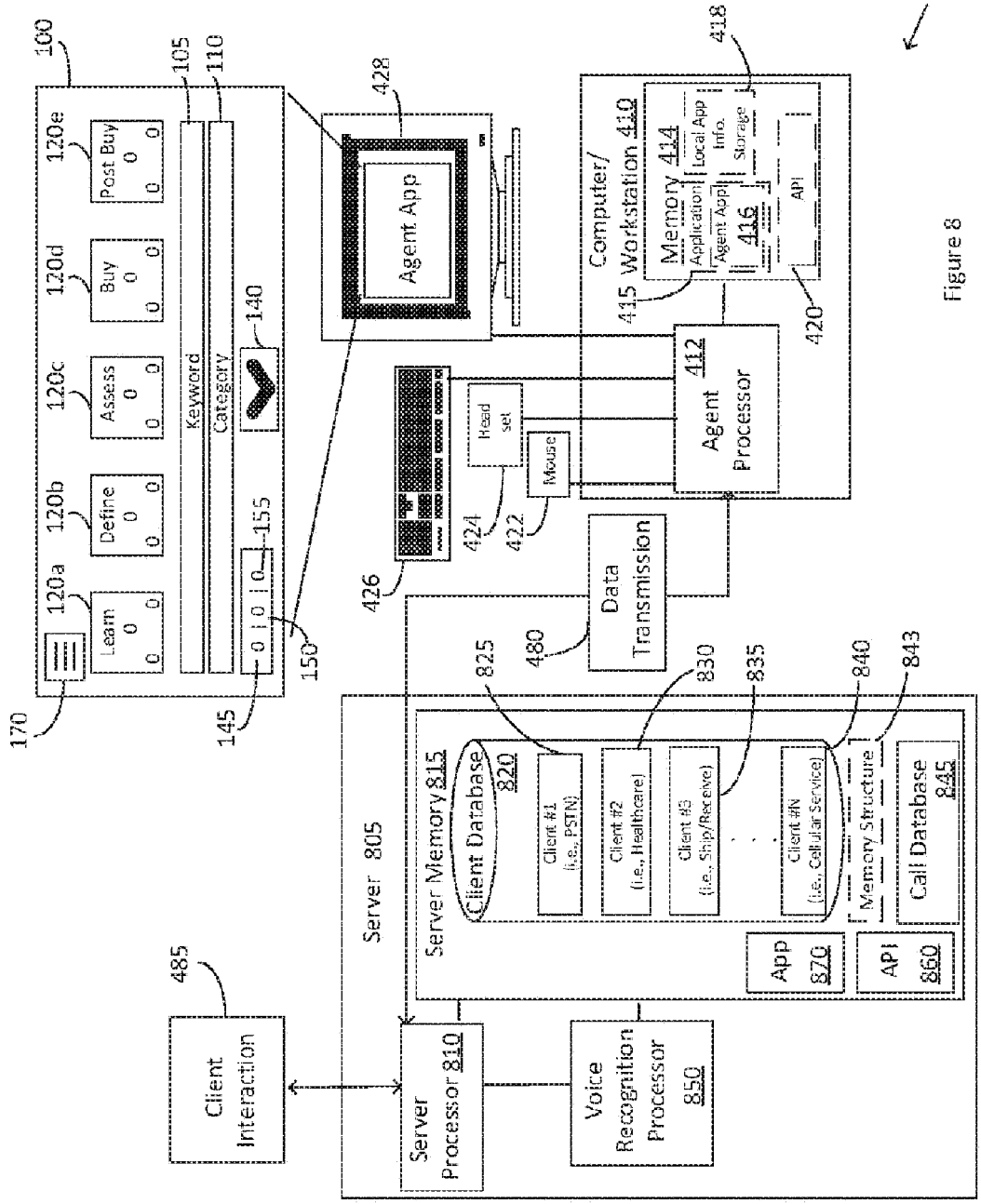
FIG. 8 illustrates a system for assisting an agent during a client interaction, in accordance with an embodiment of the application.

FIG. 8 illustrates a system for assisting an agent during a client interaction, in accordance with an embodiment of the application. Elements of FIG. 8 having reference numbers that have already been discussed may operate in a similar fashion, and will not be discussed in detail. As shown in FIG. 8, a server 805 is shown, and includes a server processor 810 coupled with a server memory 815 and voice recognition processor 850. The voice recognition processor 850 may be further coupled with the server memory 815. The server memory may include a client database portion 820, and a call database portion 845.

The client database portion 820 may include information such as one or more client keyword sets/databases that may be utilized in identifying keywords and determining associated keyword information during a client interaction. For example, the client database portion 820 may include a Client #1 keyword set 825, that provides keywords pertinent to Client #1's public switched telephone network (PSTN) business and associated keyword information. Client database portion 820 may further include a Client #2 keyword set 830 with associated keyword information appropriate for Client #2's healthcare business. Further, a Client #3 shipping/receiving client keyword set 835 with associated keyword information may be provided, and a Client #N's keyword set 840 and associated keyword information for Client #N's cellular service may be provided. In addition, in some embodiments, the server memory 815 may include a memory structure, for example, memory structure 843 that is similar to the memory structure 418 discussed above with respect to FIG. 6, for example, where the call phase scores such as the current, positive and negative call phase scores are determined at the server. The server memory 815 may further include call database 845, for example, to store call specific information for various voice interactions. The server memory 815 may further include an API portion 860 that may include software libraries, or other instructional code, allowing the server processor 810 to both unpack information received at the server, and to package information messages, for example, the transmission message 480 in a desirable communications protocol. An application portion 870 may be provided, that may provide applications, programming or other instructional code, allowing the server 805 to perform desired functions, for example, as described herein. As further shown in FIG. 8, the client interaction 485 is routed through the server processor 810, that generates the transmission message 480 providing the keyword and associated keyword information to the agent workstation 410.

The server processor 810 is a processor capable of carrying out the server capabilities and programming, including routing client interactions through the server, generating transmission messages such as transmission message 480, generating call-specific information records for the call data base 845, as well as any other functionality performed by the server. The server processor 810 may be a single processor, or a bank of processors operating together, for example, connected through a communications bus or otherwise communicatively coupled as part of a local area network (LAN). Some devices or components of the server 805 may be physical, while others may be virtual, and the components may instead be distributed across multiple locations, and communicatively coupled by an appropriate network. The server memory 815 may be comprised of RAM, ROM, flash memory, hard disks, and/or any other type of volatile or non-volatile memory. The server memory 815 may be a single memory, or may be provided as a bank of storage devices, for example, coupled with the server processor 810 through one or more communications buses, or as part of a LAN, WAN or other network. The voice recognition processor 850 may be one or more processors capable of performing voice recognition on client interactions being routed through the server 805. The voice recognition processor 850 may be coupled with the server processor 810 via a communications bus, or as part of a LAN, WAN or other network.

The server 805 may be coupled with the agent workstation 410, for example, as part of a network, such as an LAN, a wide area network (WAN), through the PSTN, or via any other sufficient communications links that allow for the transmission of data like the client interaction and the data transmission 480 between the server 805 and the agent workstation 410.

Figure 9:
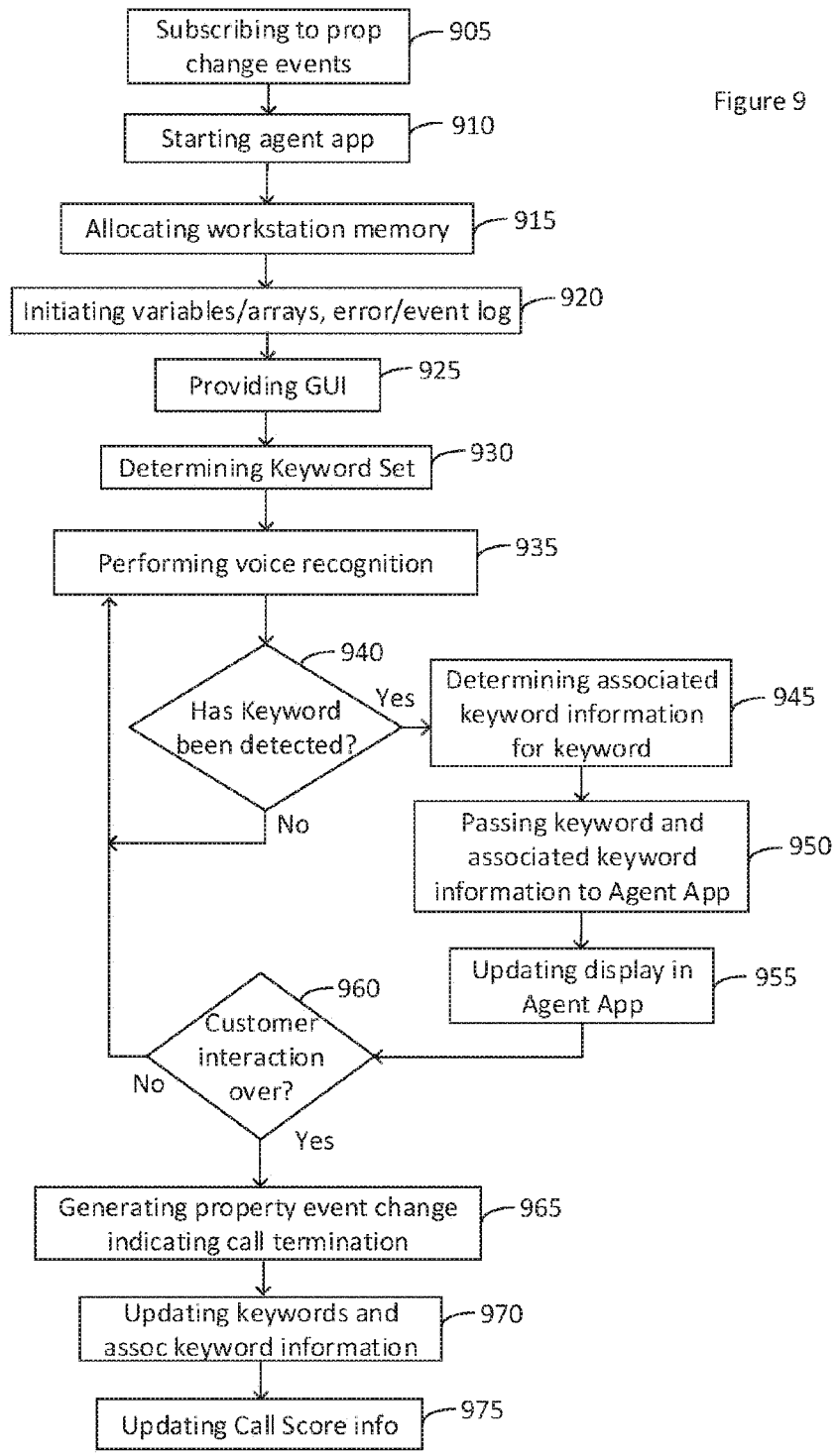
FIG. 9 is a flowchart illustrating operation of the computer system of FIG. 8, in accordance with an embodiment of the application.

FIG. 9 is a flowchart illustrating operation of a computer system for assisting an agent during a client interaction, in accordance with an embodiment of the application. FIG. 9 will be discussed with respect to the GUI 100 of FIGS. 1-3, the data structures of FIGS. 5-6, and the system of FIG. 8. Further, reference to the steps of the flowcharts of FIGS. 7A and 7B may be made.

As shown at step 905, the agent workstation 410 subscribes to a property attribute changed event. This may occur in a similar fashion as described above with respect to step 705, where at power-up, the agent workstation 410 utilizes the API 420 to subscribe to property change events related to a client interaction, including a call connected event, a keyword identified event, that may occur at the server 805. The agent application is then started as shown at step 910, for example, the agent application 416, in a similar fashion as discussed above with respect to step 710 of FIG. 7A. As shown at step 915, the agent workstation 410 memory is allocated, for example, in a similar fashion as discussed above with respect to step 715. Variables, arrays/databases and an error/event log are initialized as shown at step 920, for example, in a fashion similar to as discussed above with respect to step 720. In embodiments where call phase scores are determined at the server 805, the memory structure 843 may be additionally initialized at step 820 in a similar fashion as discussed above with respect to step 720. A GUI such as the GUI 100 is provided as shown at step 925, for example, at the agent display 428 in a similar fashion as discussed above with respect to step 725.

A keyword set is determined at step 930. For example, the server processor 810 may determine an appropriate keyword set from the client database 820. An indication of the client identity, for example, through a caller ID indication of the client interaction or through account information provided through the call initiation process, causes the server processor 810 to select the keyword and associated keyword information from client database 820 corresponding with the client identity for the current client interaction. For example, Caller ID and/or account information from the client interaction may indicate that the client is Client #2, and thus the server processor may determine at step 930 to utilize the health care keyword and associated keyword information 830 for Client #2 for that client interaction. Voice recognition is then performed at step 935. For example, the server processor 810 may route the client interaction to the voice recognition processor 850, that may utilize voice recognition and speech analytics techniques defined at the server memory (not shown) in performing the voice recognition. It may be determined at step 940 whether a keyword has been detected. This may be carried out, for example, where the voice recognition information of step 935 is passed to the server processor. The server processor 810 may compare the received voice recognition of the client interaction with the keywords of the keyword set determined at step 930. A match within a specified confidence factor, indicates detection of a keyword or phrase at step 940.

If a keyword has been detected at step 940, associated keyword information for the keyword is determined at step 945. This may occur, for example, by the server processor 810 retrieving associated information from the identified keyword set, such as interactive call phase, keyword category and weighting factor associated with the keyword identified at step 940, from the client keyword set/database identified at step 930. The keyword and associated keyword information is passed to the agent application as shown at step 950. For example, the server processor 810 may utilize the API 860 to package the keyword and associated keyword information as a transmission message 480 to the agent workstation 410.

The transmission message 480 may take the form of, for example, the transmission message 480 shown in FIG. 5, thereby passing event subscription information 510 indicating that a property attribute changed to a keyword identified event subscribed to by the agent workstation 410 has occurred. The identified keyword 520, and associated keyword information 530 that may include phase 540, category 550 and weighting factor 560 may be packaged as event specific information 515 that is passed to the agent application 416 at step 950. Thus, the agent processor 412 may receive the transmission message 480 from the server in a similar fashion as discussed above with respect to step 730.

The GUI may then be updated at the agent application as shown at step 955. Step 955 may be carried out in a similar fashion as described above with respect to step 732 of FIG. 7A, and steps 735-775 of FIG. 7B, where call phase scores are determined at the agent workstation.

In an alternate embodiment, the call phase scores may instead be determined at the server. In this alternate embodiment, referring to FIG. 7B, the storing 735 may be accomplished at the server by the server processor 810 using the memory structure 843 that is similar to the memory structure shown at FIG. 6. Thus, associated keyword information, including associated call phase, category and weighting factor determined at step 945 may be stored at the memory structure 843, in analogous variable portions, array portions, and/or call score file portions as discussed above with respect to FIG. 6. The determination of weighting factor being negative at step 740 may be performed by the server processor 810. Where the weighting factor value is negative, the appropriate phase score net and neg values may be determined at step 745. This may be accomplished, for example, where the current phase information determined at step 945 indicates that the associated phase for the identified keyword at 940 is the 'learn' phase, the appropriate phase values may be determined by retrieving the phase_learn_net_score and the phase_learn_neg_score values from the analogous variable portion 610 of the memory structure 843.

Continuing with this alternate embodiment, at step 750, the current weighting factor is added to the appropriate phase score net and neg score values determined at step 745. For example, for the 'learn' phase example mentioned above, the value of the weighting factor determined at step 945 is added to each of the phase_learn_net_score and the phase_learn_neg_score values. At step 755, the newly calculated values for the appropriate phase net and neg scores are stored back into the corresponding variables of the memory structure 843. For example, the newly calculated values for the net and neg values calculated accounting for the weighting value associated with the learn phase are stored back into the analogous phase_learn_net_score and the phase_learn_neg_score variables of the memory structure 843. The current call score value is then recalculated as shown at step 775, for example, by retrieving the current call score value from the analogous current_call_score variable of memory structure 843, adding the value of the weighting factor value to the current call score value, and storing the newly calculated call score value back into the current_call_score variable of memory structure 843.

Returning to step 740 in this alternate embodiment, where it is determined that the weighting factor value is not negative, appropriate phase score net and pos values are determined at step 760. This determining occurs in a similar fashion as the determining of step 745 discussed above with respect to this alternate embodiment. The current weighting factor value is added to the appropriate phase net and pos scores identified at step 760, as shown at step 765, in a similar fashion as discussed with respect to step 750, where the value of the weighting factor determined at step 945 is added to each of the phase_learn_net_score and the phase_learn_pos_score values of the memory structure 843. The newly calculated appropriate phase score net and pos values are then stored at step 770 at the memory structure 843 in a similar fashion as the storing of step 755, and flow continues to step 775 where the current call score is recalculated.

In this way, the current, positive and negative phase scores may be determined at the server 805 in accordance with an alternate embodiment of the application. Call phase scores may be maintained and transmitted to the agent workstation, for example, as variables (not shown) along with other keyword associated information, within event specific information 515 of the transmission message 480 of FIG. 5, in a predetermined order.

Returning to FIG. 9, at step 950, keyword and keyword associated information may be passed to the agent application. Where the agent station determines phase score information, such associated keyword information may include the current keyword, and corresponding category, phase and weighting factor, for example, as the transmission message 480 shown at FIG. 5. Where the server determines the phase scores as discussed with respect to the alternate embodiment above, the transmission message may further include phase score information, including current, negative and positive phase scores in a predetermined format (not specifically shown), within the event specific information 515 of the transmission message 480.

The information from the transmission message 485 may then be used by the agent processor in updating the display at step 955, in a similar fashion as described above with respect to step 732 of FIG. 7A.

It may then be determined whether the client interaction is over at step 960. For example, this may occur where the server 805 may receive an indication from within the client interaction 485 signaling an end to the client interaction. Where the client interaction is provided to the server as a Voice over IP (VoIP) message from a communications network such as the internet, the VoIP transmission protocol may indicate the end of the client transmission. Where the client interaction is provided from the PSTN, the cessation of voice for a predetermined period of time, a dial tone or an "on hook" indication may indicate the end of the client interaction.

If it is determined that the client interaction is not yet over at step 960, flow returns to step 935 where voice recognition is carried-out on the client interaction. If it is determined that the client interaction is over at step 960, flow continues to step 965 where the server processor may generate a property change event indicating that the client interaction is terminated. This may occur, where the server processor 810 generates a transmission message 480 indicating the call termination property attribute changed event has occurred, that is sent to the agent workstation 410. Thus, the agent workstation 410 receiving the indication that the interaction has been terminated may cause the agent processor 412 via the agent application 416 to update the call score information as shown at step 970. Updating the call score information at step 970 may be carried out in a similar fashion as discussed above with respect to step 734 of FIG. 7A. In an alternate embodiment, the updating of call score information may be carried out at the server 805, where call score information and call score files for all-time and daily call scores are maintained at the memory structure 843 in an analogous fashion as discussed with respect to FIG. 6. In this embodiment, the server processor 810 may operate to update call scores in a similar fashion as described above with respect to step 734 of FIG. 7A. In this alternate embodiment, the updating of the call score information may occur in the method of FIG. 9 between steps 945 and 950. Though not shown in FIG. 5, the call score information may be transmitted to the agent station as part of, for example, the transmission message 480 as part of the event specific information 515, at step 950, in a predetermined format.

Thus, after updating the call score information at step 975 (or after the updating keyword and keyword associated information of step 970 where call scores are dertermined at the server), the agent workstation is ready to receive additional client interactions. Additional client interactions may be handled in a similar fashion, for example, beginning at step 920.

The transmission message 480 has been described as including current keyword and current associated keyword information. It accordance with an alternate or additional embodiment, where the memory structure 843 and/or the call database 845 includes and/or maintains keyword and associated keyword information for the entire client interaction to that point (as will be discussed below with respect to the flowchart of FIG. 12 and FIG. 13), the transmission message 480 transmitted to the agent station may include keyword and keyword associated information for the entire client interaction each time a keyword is detected. In this embodiment, the memory structure 843 and/or call database 845 maintains in variable, array, or some other format, all keyword and associated keyword information that has been determined for a client interaction. Call score information (i.e., current, daily high, all-time high) as well as call phase scores may also be maintained. Though not specifically shown in FIG. 5, the keyword and keyword associated information including category, phase, weighting factor and phase scores for each keyword, as well as call score information, may be provided to the agent station as part of the transmission message or call object, for example, within event specific information 515. Such information may be provided as variables and/or arrays, or in whatever format the particular call object utilizes, each time a keyword is detected at the server. Such information may be provided in the transmission message in a predetermined format, where the agent processor is able to parse the information for the entire client interaction from the transmission message, and use the information to populate the various fields of the GUI 100.

Figure 10:
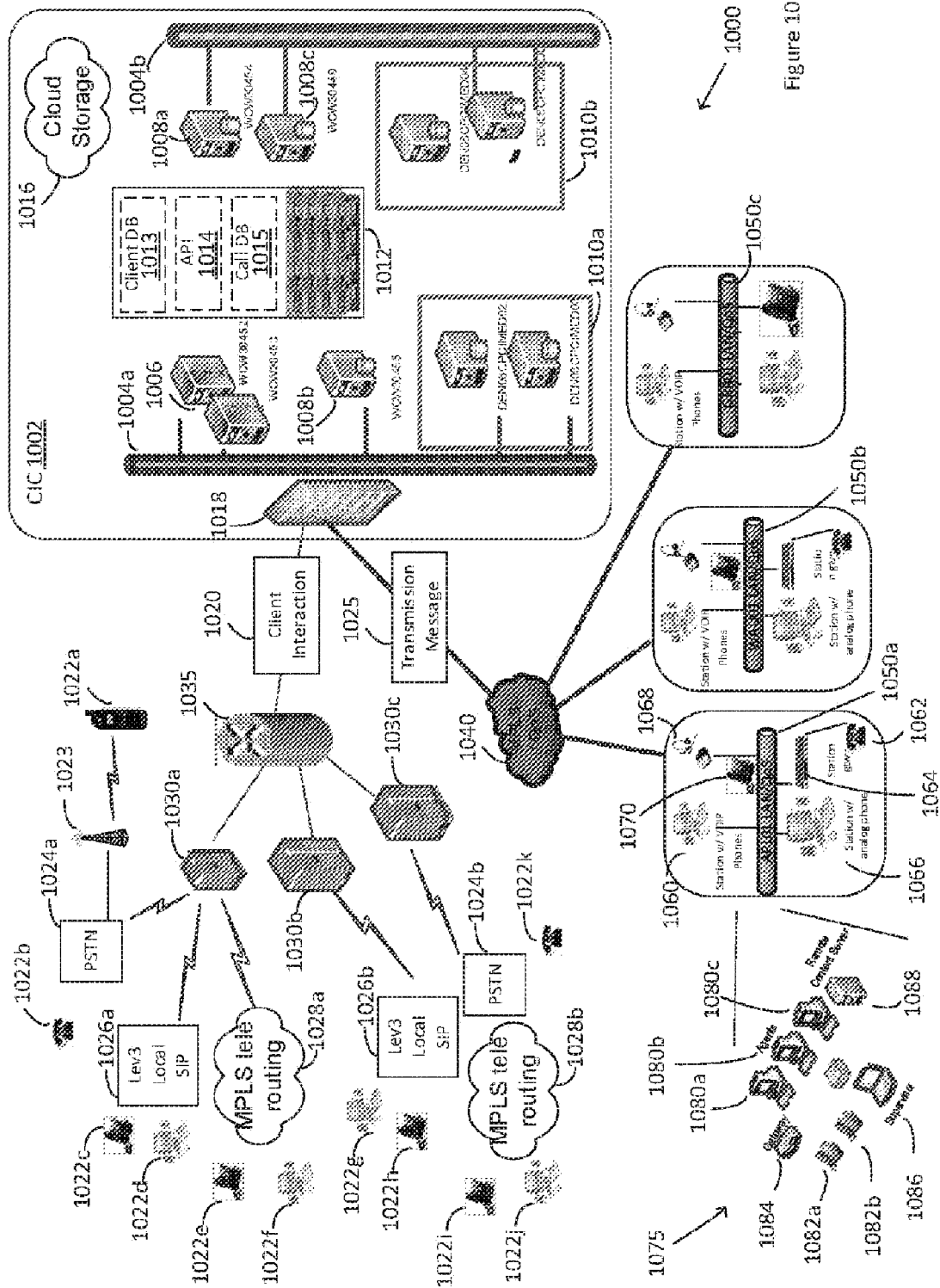
FIG. 10 illustrates a computer system for assisting an agent during a client interaction, in accordance with an embodiment of the application.

FIG. 10 illustrates a computer system for assisting an agent during a client interaction, in accordance with an embodiment of the application. As shown in FIG. 10, the system 1000 may include a call interaction center (CIC) 1002 that may include a plurality of servers and storage devices coupled through a network, for example, by busses 1004a and 1004b, that may be communicatively coupled as part of a LAN or WAN. The servers may include CIC servers 1006, shown as a switchover pair, one or more session manager servers, such as session manager servers 1008a-1008c, as well as voice processing servers shown within media voice processing server banks 1010a and 1010b. Further, storage may be provided, for example, as a bank of memories such as memory 1012 and/or off site storage, as a cloud memory storage 1015.

The memory 1012 and/or cloud memory 1016 may include client database 1013, an API 1014 and a call database 1015. Though not specifically shown, the client database 1013 may include keyword sets and associated keyword information, for example, similar to the client database 820 and keyword sets 825-840 described above with respect to FIG. 8. The API 1014 may include software libraries and/or other files or instructional code that allow the CIC server 1006 to receive message as a client transmission in its respective communications protocol, and perform any necessary unpacking and routing of the message(s). The API provides the necessary libraries allowing the CIC server 1006 to route messages to the session manager servers 1008a-c, media servers 1010a-b, and to the memory 1012 and storage 1016. Further, the API 1016 includes files/libraries sufficient for allowing the handling of event subscriptions, and broadcasting property change events, as well as transmission messages from the CIC 1002 to the MPLS/QoS 1040 and/or to the various LANS 1050a-c. The API may further include libraries and files allowing for communicating to various applications or programming at the CIC 1002. The API may thus include software libraries for handling, for example, VoIP protocols, IP protocols, Interaction Center Extension Libraries (IceLib) protocols, etc., used for the transferring of information between various servers, devices, memories and any programs/applications running at the CIC 1002. The API 1014 may include other software libraries allowing the CIC 1002 to carry out the functionality described herein. The call database 1015 may store client interactions, for example, as log files, representing keyword and keyword associated information. For example, in addition to the keyword and keyword associated information discussed above, speech analytics information may be stored in a call log, such as confidence information that a particular word or syllable has been identified for the corresponding keyword/keyphrase detected, etc. The CIC 1002 may further include a firewall 1018. The firewall may be a PCI firewall vault.

Though not shown, the memory 1012 or cloud storage 1016 may further include an application portion, similar to the application portion 870 discussed with respect to FIG. 8, that may be used by the CIC for carrying out applications or other programming or functionality of the CIC. Further not shown, the memory 1012 or storage 1016 may include a memory structure similar to the memory structure 843 for use in determining phase scores at the CIC 1002, and an error/event log file similar to that discussed above with respect to FIG. 6. The error event/log file may include errors generated by the application, as well as events occurring while the application is running (i.e., indicating application start, telephony log in, keyword utterance events with associated keyword information, telephony log out, application close, etc. . . . ).

The various servers and memory storage of the CIC 1002 may be located at a single location, or may be distributed across several locations. Thus, the data busses 1004a-1004b may represent LAN communications links, WAN communication links, or other network links that utilize the Internet, PSTN or other communications lines that are capable of providing the transmission of events and data between the servers and memory storage devices. Further, the CIC servers 1006 may be virtual at the CIC, residing within the cloud storage 1016, for example, as part of a West Cloud implementation using CISCO USC infrastructure. The servers 1006 may reside behind the PCI firewall vault 1018. The session servers 1008a-1008c may be physical.

A client interaction (i.e. a voice call) represented at 1020 may be received at the CIC 1002. The client interaction representation at 1020 may be, for example, an interaction converted to a VoIP communications protocol as discussed below. Thus, client interaction 1020 may be one or more message packets representing a client interaction between a client and an agent. The client side/channel of the client interaction 1020 may be, for example, one of the various devices 1022a-1022k shown. for example, the client side of the client interaction 1020 may be initiated through the PSTN 1024a for devices 1022a-1022b, may be received via a level 3 local session internet protocol (SIP) network such as SIP 1026a or 1026b, that serve, for example, devices 1022c-1022d and 1022g-1022h, respectively. The client side may be supported by multi-protocol labelling switch (MPLS) telephone routing shown at 1028a, for example, that serves devices 1022e-1022f, and MPLS routing 1028b, that may serve devices 1022i-1022j.

The client interaction may be converted to a VoIP protocol transmission at SONUS servers 130a-130c. The SONUS servers may utilize the SONUS GSX architecture in providing VoIP conversions, thereby providing an internet protocol (IP) client side end point for a particular client interaction represented at 1020. The SONUS VoIP servers 130a-130c may be communicatively coupled with a SIP server 1035, for example, using the SIP protocol to provide the client interaction 1020 to the CIC 1002. The SIP server 135 may be, for example, an ATL manufactured server, thereby providing IP endpoints for VoIP servers 1030b-1030c. The CIC server 1002 may further be coupled, on the agent's side to various LANs such as LANs 1050a-1050c, through, for example, the MPLS/quality of service (QoS) network 1040. The LANs 1050a-1050c may be located within the same facility, within the same town or city, or located in different cities. A transmission message 1025 is shown, that may be used to transmit information for a client interaction to an agent station. For example, the transmission message 1025 may be a property attribute changed event for an event subscribed to at the CIC 1002, and/or transmit data to an agent station, such as keyword and keyword associated information identified during a client interaction. As such, the transmission message may include similar information as the transmission message 485 discussed above with respect to FIG. 5. The transmission message may, in an alternate embodiment described above with respect to FIG. 9, include all keyword and keyword associated information, and/or call score and phase score information for a client interaction to that point.

Looking at a representative LAN 1050a that may support one or more agents, various stations and agent devices are provided, such as an agent station 1060 utilizing a VoIP phone, a plain old telephone service (POTS) device 1062, that may be converted to a network or VoIP protocol via gateway 1064. Further, an analog phone station 1066 may be provided, that handles the conversion between the agent and the client to a network or VoIP protocol, and a headset station 1068 and network telephone terminal station 1070, where each are capable of communicating with a client via a network and/or VoIP communications protocols. The other representative agent LANs 1050b-1050f may include similar components.

A typical representation 1075 is provided for an agent LAN, For example, the agent LAN 1050a. As shown, agents may utilize workstations 1080a-1080c, that may include headsets or other devices not shown allowing them to communicate with a client. In addition or in the alternative, network telephone stations 1082a-1082b correspond with respective workstations 1080a-1080b and/or 1080c, allowing an agent to communicate with the client, either directly, through an agent station, or through a gateway 1084. A supervisor station 1086 is shown, as well as a remote content server 1088, for example, that may manage communications between the agents using stations 1080a-1080c, network telephone devices 1082a-1082b, and a supervisor 1086, with an outside network such as the MPLS/QoS network 1040, via LAN 1050a.

A typical agent station, such as 1080a-1080c, may functionally be as described above with respect to the agent station 410 discussed above with respect to FIG. 4. The agent stations 1080a-c may utilize an Intel i5 processor, and include 8 gigabytes of RAM, and a 500 GB hard drive. Other workstation specifications/capabilities may be utilized. The agent stations 1080a-1080c, for example, may provide the agent application, for example, the agent application 416, that generates, maintains and provides the graphic user interface 100 described with respect to FIGS. 1-3. The agent application may be provided, for example, in a Windows presentation format (WPF) application, utilizing a C# code base that runs as a stand-alone application on the agent station. Agent stations such as stations 1080a-1080c may be equipped with appropriate APIs (not shown in FIG. 10), to listen for subscription property attribute changed events subscribed to at the CIC servers 1006, the events, for example, including call connected, keyword spoken, and call termination events. Other subscription events may be subscribed to. Thus, the agent stations 1080a-1080c are able to listen for property attribute changed events for their subscribed events for a particular client interaction, and upon detection of a property change event, will receive an appropriate transmission message providing information relative to the particular subscription event subscribed. For example, where the property attribute changed event from the CIC 1002 indicates that a keyword has been detected within a client interaction 1020 involving the particular workstation, the CIC 1002, for example, CIC servers 1006, provide the keyword and keyword associated information to the respective workstation handling the client interaction. The subscription events and transmission message may be accomplished between agent stations and the CIC 1002 using, for example, IceLib at the API 1014, for example, that is a software development kit (SDK) providing access to a library of API objects running on the CIC server 1006 as a PureConnect product, with server version CIC 2016 r4 having a current SDK as 2015 r3.

FIG. 11 illustrates an exemplary client keyword set/database and associated keyword information for a client, in accordance with an embodiment of the application. The database of FIG. 11 may be stored at client database portion 1013 of the CIC 1002. The exemplary client keyword database represented at FIG. 11 may instead be provided via cloud storage 1016. As shown in FIG. 11, the exemplary client database 1100 may include a phase column 1105, category column 1110, a keyword or keyphrase column 1115, and a keyword score (weighting factor) column 1120. The keyword/phrase column 1115 includes keywords that the CIC server 1006 searches for during a client interaction. The phase, category and score columns 1105, 1110, and 1120 provide associated keyword information that corresponds to a particular keyword or phrase that may be identified during the client interaction 1020.

The keyword database 1100 may provide information for various phases of a call. For example, as shown at 1125, a keyphrase "on a recorded line" of column 1115 may be associated with phase information 'learn' of column 1105, category information 'Engage Customer' of column 1110, and with a '1' value for weighting factor of column 1120. The weighting factors shown in the keyword score column 1120 may be progressively weighted, increasing in value as a call phase increases from the 'Learn' phase through a 'Post Buy' phase. Further, the weighting factors may have positive or negative values. As shown in FIG. 11, a keyword phrase "provide you with any assistance" may be associated with a positive weighting factor of '1' as shown at 1135, where the positive value for the weighting factor indicates that the keyword or key phrase is one that is encouraged to be used by the agent. The keyword weighting factor may also have a negative value, for example, as shown at 1140 associated with a keyword phrase "just checking in", where the negative value associated with the weighting factor indicates that the corresponding keyword is one the agent is discouraged from using.

The exemplary client database 1100 is merely a representative, and as shown may be a partial database. More keyword/keyword phrases may be provided for each of the keyword phases and categories. As discussed above, a keyword may be a single word, or multiple words that together form a phrase. Further, the keyword categories shown at column 1110 are representative as well, and additional keyword categories may be associated with additional keywords provided for each of the phases of a client interaction. Further, the client database of keyword and keyword associated information may be altered or updated, for example, to encourage (or discourage) the use of additional keywords. Thus, additional keywords may be added (or subtracted) from the client keyword database. Further, other category and/or phase information may be used to classify additional keywords, where desirable for a particular client product, service or circumstance.

The client interaction may be initiated by either a client or an agent. Where a client initiates a client interaction, such an interaction may be initiated, for example, at any of the devices 1022a-1022k, where a telephone number for assistance is dialed. An operator or DTMF menu structure may be provided to the client, allowing the client to provide their client information such as a client account number, identification number or the like, and indicating why they are seeking an interaction. The CIC 1002 receives the client interaction information, for example, as client interaction 1020, and determines an appropriate agent for routing the interaction. The CIC 1002 then establishes a communication path to connect the client with an appropriate agent, for example, an agent that utilizes agent station 1080a.

Instead, a client interaction may be initiated from the agent side, where an agent (or an automated dialer) dials a client telephone number. For example, the agent side may be initiated from an agent terminal 1080a, from within a particular agent LAN, such as LAN 1050a, or may be initiated from the CIC server 1002, and upon connection with a client, the CIC ties the agent to the call.

Figure 12:
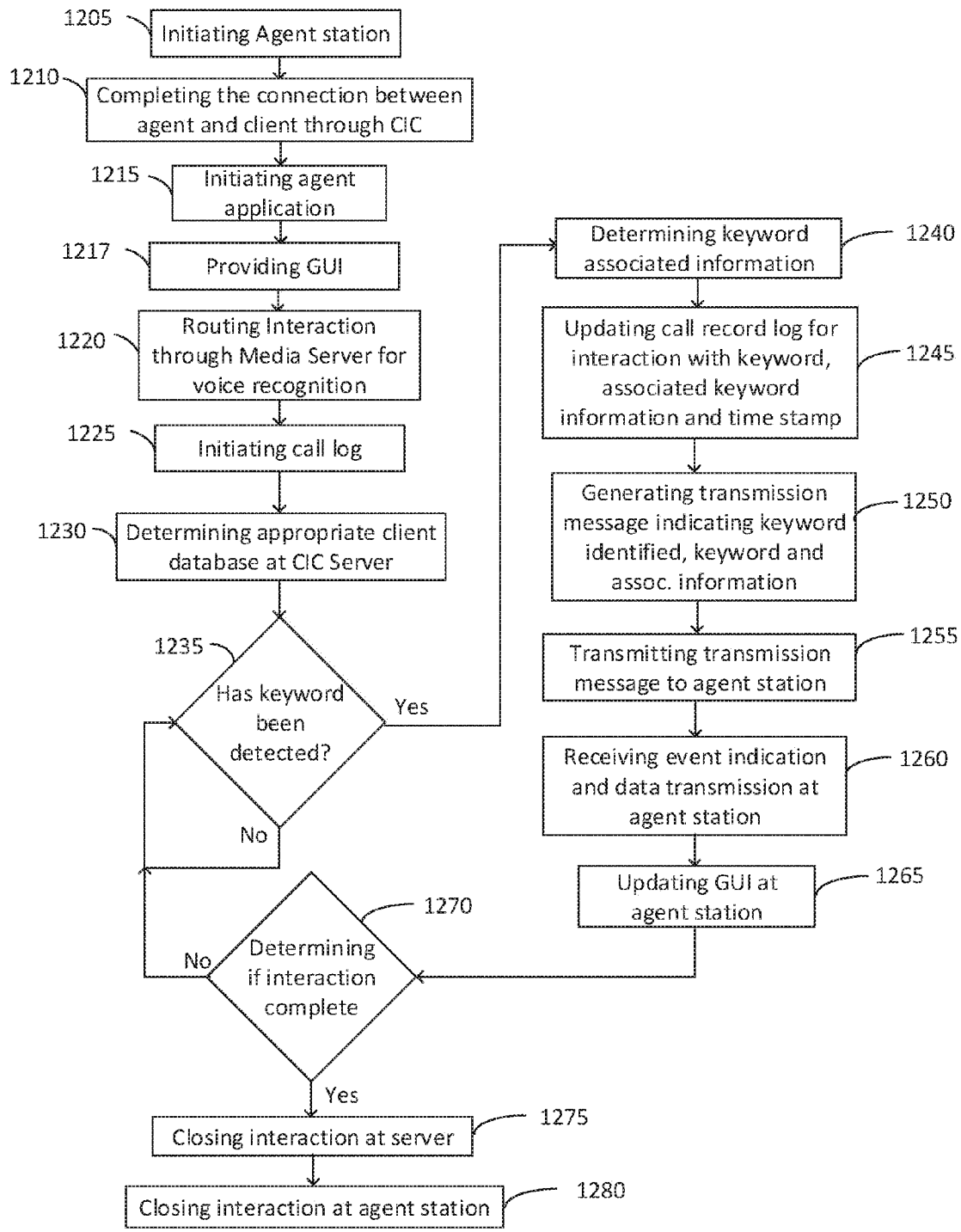
FIG. 12 is a flowchart illustrating the operation of the system of FIG. 10 in assisting an agent during a client interaction, in accordance with an embodiment of the application.

FIG. 12 is a flowchart illustrating the operation of the system of FIG. 10 in assisting an agent during a client interaction, in accordance with an embodiment of the application. The discussion of the flowchart of FIG. 12 may refer to the GUI 100 of FIGS. 1-3, the systems of FIGS. 4 and 8, and to the exemplary client keyword database of FIG. 11. The flowcharts of FIGS. 7A, 7B and 9 will also be made reference to. For the flowchart of FIG. 12, it is assumed that the agent station has been powered-up.

As shown in step 1205, an agent station, such as the station 1080a, is initiated. This may occur in a similar fashion as described above with respect to step 705 of FIG. 7A, where the agent station subscribes to certain events occurring at the CIC.

As shown at step 1210, the client interaction 1020 is connected by the CIC server. For example, the CIC server 1006 may utilize information provided within the client interaction by the client and/or a reason for their call to determine an appropriate agent with which to connect the call, and route the call to the agent, for example, through MPLS/QoS 1040, to the LAN 1050a, and to agent station 1080a. The client interaction may be provided to the CIC 1002, for example, using SIP protocols, and transmitted from the CIC 1002 to an agent using IceLib protocols as part of an API software library package common to the CIC 1002 and the agent stations, including station 1080a. Any necessary communications protocol layering may be employed, for example, to allow the client interaction and any transmission message(s) 1025 to be transmitted to the agent station 1080a, for example, using the MPLS/QoS network 1040, and LAN 1050a.

As shown in step 1215, an agent application is initiated. Though not shown in detail, the agent stations, for example, station 1080a, may be similar to the agent station 410 discussed above with respect to FIGS. 4 and 8. When initiating the agent application, a call initiation subscription property change event may be sent from the CIC server 1006 to the agent station 1080a (i.e. as part of, or triggered by, the completion of step 1210) that subscribes to subscription property attribute changed events such as call initiation, keyword identification, and call termination. The attribute property changed event may be provided by the CIC server 1006 as part of the completing of step 1210. The application initiation of step 1215 may occur in a similar fashion as described above with respect to steps 710-720 of FIG. 7A. Reception of the call initiation subscription event property change may cause the agent application to open at the agent station 1080a in a similar fashion to agent application 416 being started at step 710. Memory allocation and variable/array initialization may occur at the agent station 1080a in a similar fashion as described with respect to step 715 and 720.

After the agent application is invoked at step 1215, a GUI is provided at step 1217. The GUI may be provided, for example, as the GUI 100, at a display of the agent workstation 1080a in a similar fashion as described above with respect to step 725.

As shown at step 1220, the CIC server 1006 may route the interaction through a media voice processing server of the media servers bank 1010a, to provide voice recognition for the client interaction. In the alternative, the CIC server 1006 may allow the media server to tap the client interaction. The routing 1220 may also include a session manager server, i.e., sessions manager server 1008a, storing the client interaction as a voice recording at the memory 1012 and/or cloud storage 1016 as recordings indexed and stored on separate SAN partitions attached to the session manager. The voice recording may be tapped at the media server.

As shown at step 1225, the CIC server 1006 may initiate a call log file within the call database portion 1015 for the client interaction. The call log record may store information for a call upon detection of a keyword, including the keyword and associated keyword information like associated phase, category and weighting factor, as well as a date and time stamp for the portion of the call where the keyword was identified. Other information may be stored as part of the call log, as disclosed below. The generation of the call log file during the client interaction will be discussed in more detail with respect to FIG. 13.

As shown at step 1230, the appropriate client keyword database is determined by the CIC server 1006. This may be accomplished in a similar fashion as discussed above with respect to step 930 of FIG. 9. For example, utilizing caller ID information and/or account information provided by a client, the CIC server 1006 may identify the appropriate database to be utilized for the current client interaction from the client database portion 1013.

As shown at step 1235, it is determined whether a keyword or keyword phrase has been detected within the client interaction. For example, the CIC server 1006 receiving the voice recognition from the media servers 1010a of step 1220, may compare the voice recognition with the identified keyword database of step 1230. Speech analytics may be utilized in determining whether the particular keyword and/or phrase within the client interaction is identified, for example, in a similar fashion as described above with respect to step 940 of FIG. 9. The client keyword database 1013 may further include information in each client keyword database useful to the CIC server 1006 in identifying whether a keyword has been detected. For example, phonetical information, along with confidence factors for each phonetic syllable and/or word, may be utilized in making the keyword identification at step 1235.

Where a keyword has been detected at step 1235, flow continues to step 1240 where keyword associated information is determined by the CIC server. For example, the CIC server 1006 may access the appropriate client database of client database portion 1013 in which the keyword was identified, and retrieves the associated keyword associated information, for example, a phase, category and weighting factor associated with the identified keyword.

As shown at step 1245, the call log for the client interaction may be updated. For example, the keyword and associated keyword information, as well as a date and time stamp for utterance of the keyword may be stored as part of the log file of call database portion 1015 initiated at step 1225 above. This may include updating variables stored at the CIC server 1006, for example, a current_keyword, current_keyword_category, and current_key_phase and current_keyword_weight factor variables that are used to populate the update to the call log file. Other information may be stored, for example, confidence indications pertinent to the particular syllable or word for the particular keyword identified. Upon detecting a change to one or more of these variables, the CIC server 1006 may generate a transmission message, for example, the transmission message 1025, as shown at step 1250. The transmission message may include the property attribute changed event, and keyword and keyword associated information for a keyword variable and other variable associated therewith that have changed at the CIC server 1006. The transmission message may take the form described above with respect to FIG. 5. The transmission message 1025 may instead utilize any appropriate format. For example, transmission message may be generated as a call object within the CIC server 1006, assigning properties for the information to be transmitted (i.e., subscription event, keyword and keyword associated information) as respective strings and integers, to the API 1014 that handles the transmission using IceLib SDK. The transmission may be generated as one or messages, using one or more packets of data. In one embodiment, the transmission message includes keyword and keyword associated information for only the current keyword identified. In another embodiment, the transmission message includes keyword and keyword associated information for all keyword and corresponding keyword associated information, for the entire client interaction to that point. In this later embodiment, the call log database 1015 may be utilized along with other information stored at the memory 1012 or storage 1016 that maintains call score and/or phase score information, to provide the information transmitted via the transmission message.

The transmission message is then transmitted to the agent station as shown at step 1255. For example, the CIC server 1006 may utilize the Iceib SDK that supports subscribing to events, and subscription property changes, and transmit the transmission message. The IceLib may utilize additional communications layers and protocols to allow the message to be routed to the appropriate agent station, for example, the agent station 1080a.

The subscription property attribute changed event and keyword and keyword associated information is received at the agent station, as shown at step 1260. The agent station 1280a, using a resident API, is able to parse the message and provide it to its agent application running thereon. For example, the agent station may include the IceLib SDK as part of its API, that it may use to determine that the property attribute changed event has occurred, and to determine the keyword and keyword associated information from the transmission message (i.e., the passed object from the CIC server 1006) to pass on to the agent application. The keyword and keyword associated information may be for the current identified keyword, or in an alternate embodiment, may be keyword and associated keyword information, as well as call score information and phase scores for the entire client interaction to that point in time.

The GUI, for example, GUI 100, at the agent station 1080a may then be updated as shown at step 1265. For example, the agent application, receiving the information for a currently identified keyword and keyword associated information, may update the appropriate phase scores associated with the phase of the received keyword, accounting for the received weighting factor, as well as updating keywords and associated keyword information within the GUI 100 in a similar fashion as discussed above with respect to step 734 of FIG. 7A and steps 735-775 of FIG. 7B. Embodiments where the current, positive and/or negative phase score is determined at the server 1006 (for example, as discussed with respect to FIGS. 8 and 9), or at the agent work station (i.e., as discussed with respect to FIGS. 4 and 7), are contemplated. In the alternative, the keyword and keyword associated information may be updated as indicated with respect to step 970 of FIG. 9.

As shown at step 1270, the CIC server 1006 determines whether a client interaction is over. For example, a message received from the SIP server 1035 for the client interaction 1020 within the VoIP communications protocol may indicate that the client interaction has been terminated. Where the interaction is determined as not terminated at step 1270, flow returns to step 1235. Where it is determined that the client interaction is over, flow proceeds to step 1270 where the client interaction is closed at the CIC 1002. For example, the CIC server 1006 may send a subscription property attribute changed event indicating call termination to the agent station 1080a subscribed to the CIC 1002 for such an event. The CIC server 1006 may close any recording files that recorded the client interaction, as well as closing the call log file of step 1225 for that client interaction.

The client interaction is closed at the agent station as shown at step 1280. This may occur in a near simultaneous fashion as the closing of step 1275, and in a similar fashion as described above with respect to steps 733-734 of FIG. 7A. For example, the property change event indicating call termination may be received at the agent station 1080a, and the agent station may perform any final updating of call scores. At this point, the agent station 1080a is ready for a new client interaction. When a new client interaction is initiated, the agent application may reinitialize and set to zero any variables and arrays, and repeat as described above with respect to step 1220 with the interaction being routed through the media server.

In an alternate embodiment, similar to the alternate embodiment discussed with respect to FIG. 9, it will be appreciated that a transmission message may include keyword and keyword associated information, as well as call score information, for an entire client interaction to that point. In a further or alternate embodiment, it will be appreciated that the phase score information may be determined at the server 1006 and transmitted to the agent workstation, for example, in a similar fashion as discussed above with respect to FIGS. 7B, 8 and 9 above. In the alternative, the phase score information may be determined at the agent work station, as discussed with respect to FIGS. 4, 7A and 7B above. Though not specifically shown, it will be appreciated that the agent application may detect and record errors and events that occur during its operation that are saved as a text file. Such events, may include, for example, events indicating application start, telephony log in, keyword utterance events with associated keyword information, telephony log out, application close, etc. . . . .

Figures 14, 16:
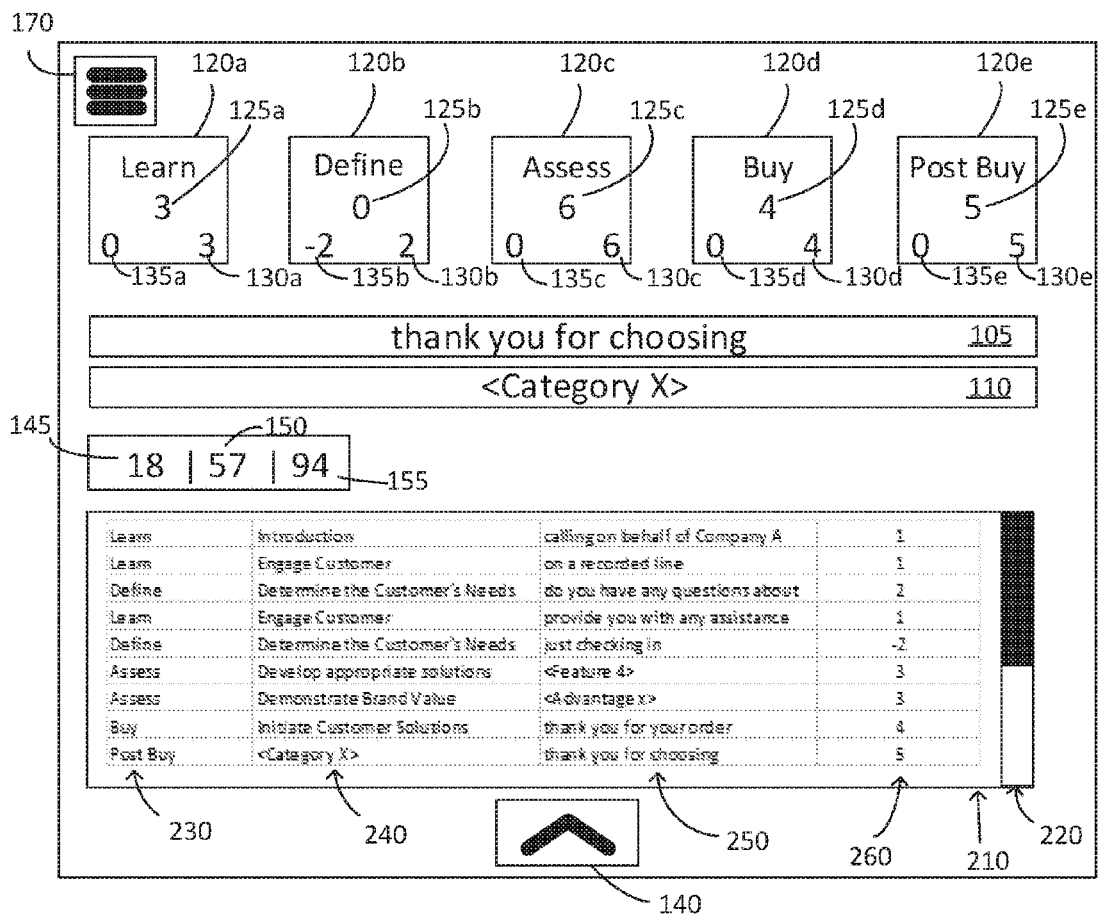
FIG. 14 illustrates a representative array that may be generated, as the keywords of the client keyword database of FIG. 11 are identified, in accordance with an embodiment of the application.
FIG. 16 provides an exemplary GUI that may be provided resulting from the keywords of the client keyword database of Figure being identified, in accordance with an embodiment of the application.
Figure 15:
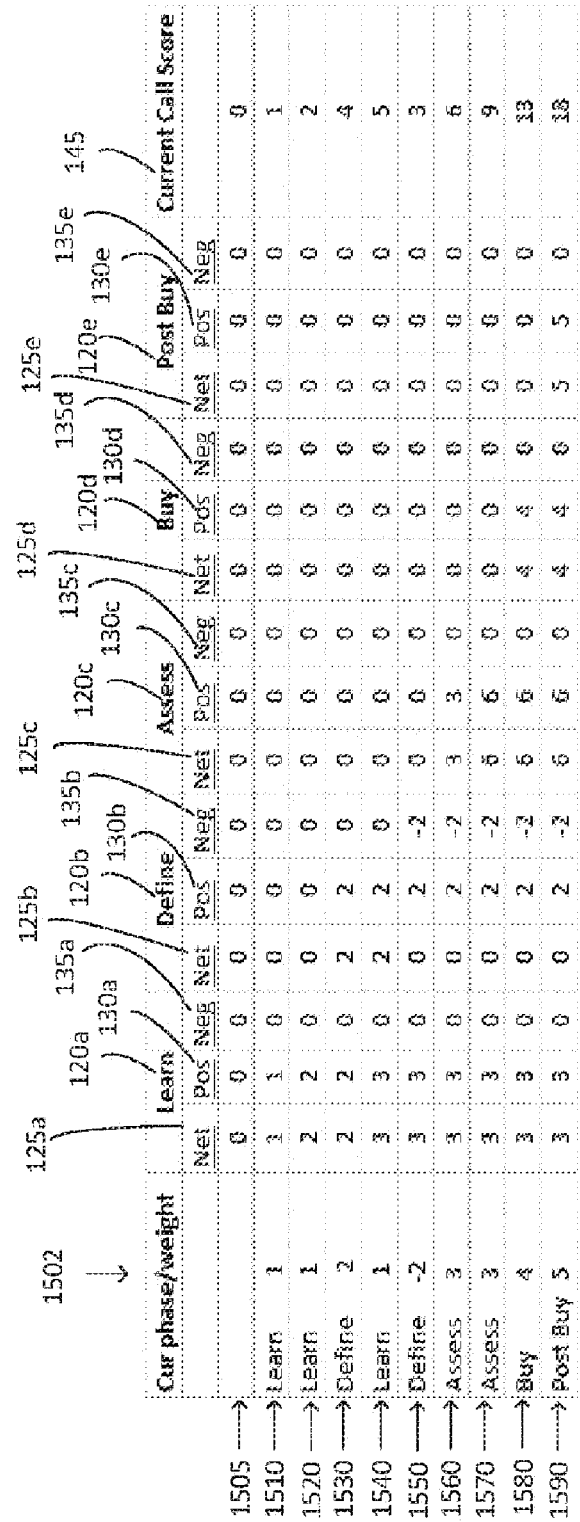
FIG. 15 illustrates an exemplary score state table showing the progression of scores as the keywords of the client keyword database of FIG. 11 are identified, in accordance with an embodiment of the application.

FIGS. 13-15 will now be discussed. FIGS. 13 and 14 illustrate a representative call log file generated at a the CIC and array generated at the agent workstation, respectively, for a client interaction where the keywords set forth in the client keyword database of FIG. 11 are identified during a client interaction, in accordance with an embodiment of the application. As discussed above, the array may instead be generated at the server, for example, at the memory structure 843 of FIG. 8, or the memory 1012 or storage 1016 of FIG. 10. FIG. 15 is a scoring state table, illustrating the alteration of the various phase scores as keywords of client keyword database of FIG. 11 are identified, in accordance with an embodiment of the application. For the purposes of FIGS. 13-15, all specified keywords of the exemplary client keyword database of FIG. 11 are assumed to have been identified.

As mentioned above, the client keyword database file of FIG. 11 is merely representative, as typical client keyword database file contain more keywords per phase, and keywords associated with additional categories in each phase. References will be made back to the flowcharts of FIGS. 7A, 7B, 9 and 12, as well as the systems of FIGS. 4, 8 and 10 and the exemplary client keyword database 1100 of FIG. 11.

As described with respect to FIG. 12, a call log file like the call log of FIG. 13 for a client interaction is initiated at step 1225, and updated as keywords are identified in the client interaction at step 1245. As shown in FIG. 13, the call log record (i.e., at call database portion 1015) may be used to record a keyword identified during the client interaction at 1305, as well as a phase, category, weighting factor, and date/time associated with the identified keyword at 1301, 1303, 1307 and 1309, respectively. As discussed above, other information may be stored in the call log file. As described at step 735 of FIG. 7B, a currently identified keyword and keyword associated information is stored in an array (i.e., of the array portion 620 of the information storage 418 of FIG. 4, the memory structure 843 of FIG. 8 or the call database 1015 of FIG. 10). The array of FIG. 14 illustrates such an array. As shown in FIG. 14, an array may be utilized to maintain lists of keywords at column 1406, and keyword associated information such as the phase, category and score corresponding with the identified keyword, at columns 1402, 1404 and 1408, respectively, for a client interaction. The array of FIG. 14 may be utilized in populating the keyword list, for example, keyword list 210, that is displayed when keyword list expansion button 140 is selected within the GUI 100. Thus, after the client interaction has begun, but before any keywords have been identified, the call log file shown at FIG. 13 and the array shown at FIG. 14 would contain no entries.

FIG. 15 illustrates an exemplary score state table that shows the progression of how the scores change for the various phases as keywords are identified during a client interaction. The score state table of FIG. 15 represents changes to the score values for the various phase scores and current call score, for example, that may be maintained at the variable portion 610 of FIG. 6, the memory structure 843 of FIG. 8, or the memory 1012 of FIG. 10 for a client interaction. The score state table will represent each phase score that is displayed through the GUI 100 discussed above. Thus, the state table includes columns for net phase scores 125a-125e, positive phase scores 130a-130e and negative phase scores 135a-135e. A current call score 145 is shown. For convenience, a column indicating the phase and weighting factor for the keyword affecting the score is provided at 1502. Thus, at the beginning of a client interaction before any keywords are identified, no scores would have yet been altered, so the current score for all phases and the current call score would be as shown at line 1505 as "0."

Upon detecting a keyword during the client interaction, for example by the CIC server 1006 at step 1235, the call log is updated with the keyword and keyword associated information, at step 1245. Further, the identified keyword and associated keyword information is received at the agent station, for example, as described at step 730 of FIG. 7B, step 945 of FIG. 9 or step 1260 of FIG. 12. Appropriate phase scores and the call score are calculated, for example by the agent processor, as described with respect to steps 740-775 of FIG. 7B. Such calculation may be carried out at the server processor or the agent workstation as discussed above with respect to FIG. 9.

Referring to FIGS. 11-15, a keyword is identified during the client interaction, where the keyword is 'calling on behalf of company A' of FIG. 11. The CIC server 1006 may then identify associated keyword information, including that the keyword is associated with the 'Learn' phase, for an 'introduction' category, with a weighting factor of '1', for example, as described with respect to step 1235. The CIC server 1006 may then update the call database log represented at FIG. 13, stored at call database portion 1015 by adding a line 1310 the log database file of FIG. 13 for the client interaction. Upon identifying whether a keyword has been detected at step 1230, the CIC server may provide a date time stamp of the detection of the keyword for line 1310, here indicating in column 1309 that it was detected on 2018 month 3 day 12 at 13 hours 42 minutes 5 seconds and 3 milliseconds time frame. Upon receipt of the keyword and associated keyword information at the agent station, the agent processor may store the keyword and keyword associated information in the array of FIG. 14 at line 1410. Line 1410 may thus indicate a phase 'Learn' at column 1402, keyword category 'Introduction' at column 1404, and keyword score of '1' at column 1408 for the identified keyword 'calling on behalf of Company A.'

The scoring updates represented by the scoring state table may be determined, for example, as described with respect to steps 740-775 of FIG. 7B. As discussed above, such phase score determination may occur at the agent station, or at the server. Thus, upon the detection of the 'calling on behalf of company A' keyword, the associated keyword weighting factor of '1' is added to the current net and pos phase scores 120a, 125a, for the learn phase, and to the current call score 145. The appropriate phase score values are taken from line 1505, added with the weighting factor value, and stored back as the values in line 1510, thereby showing the affect of the keyword having been identified for the 'learn' phase with a value of '1.' This yields the changes shown at line 1510, where the pos and net scores 120a, 125a, as well as the current call score 145, are each updated to values of '1'. Thus, the score state table shows that both the pos and net 'Learn' phase scores 120a and 125a for the learn phase 120a would each be updated on the GUI 100 with values of '1.' The current call score 145 would also be updated to a value of '1' of the GUI 100.

The process repeats for the remaining keywords and associated keyword information shown in the exemplary client keyword database file of FIG. 11. For example, the next keyword identified may be the 'on a recorded line' phrase, with associated keyword information for the 'Learn' phase, 'Engage Customer' category and a weighting factor of '1.' The keyword and associated keyword information is stored in the call log file of FIG. 13, as shown at line 1320, with the date/time stamp shown at column 1309. The keyword, phase, category and weighting factor value is stored as well in the array as shown at line 1420 of FIG. 14. Further, the weighting factor '1' is added to the current learn phase pos and net score values 125a and 130a, and the current call score value 145, and the resulting sum stored in the respective locations shown at line 1520. Thus, the GUI 100 'Learn' pos and net scores 125a and 120a, and current call score 145, are all displayed as indicated at line 1520, with values of '2'.

The next keyword identified is the 'do you have any questions about' phrase from FIG. 11, and the keyword and its associated keyword information is stored in the call database file of FIG. 13 as shown at line 1330. Agent array file of FIG. 14 is also updated, for example, as shown at line 1430, with the newly identified keyword and keyword associated information. Referring to FIG. 15, the current weighting factor value of '2' and the current phase 'define' causes the value of '2' to be added to the define pos and net scores 130b, 125b, and to the current call score 145, resulting in the current call scores shown at line 1530 for the various phases and the current call score. Thus, the pos and net scores for the define phase 130b and 125b are each updated to be '2', with the current call score being updated as '4' at GUI 100.

The next identified keyword is the 'provide you with any assistance' keyword phrase of FIG. 11, that results in the call log file of FIG. 13 being updated by the addition of line 1340, the array shown in FIG. 14 to be updated by the addition of line 1440, and the score state of FIG. 15 to be altered as shown at line 1540. One item of note, is that the identified keywords during a client interaction may not occur in phase order. For example, referring to the log file of FIG. 13 that has recorded identified keywords in the order in which they have occurred in the client interaction, a keyword relating to the 'Learn' phase was recorded at Line 1320. The next keyword identified in the interaction was associated with the 'Define' phase, shown at line 1330. The next keyword identified was associated back with the 'Learn' phase as shown at line 1340.

The next identified keyword is the 'just checking in' phrase, resulting in updating the call log file of FIG. 13 by the addition of line 1350, and the updating of the array of FIG. 14 with the addition of line 1450, and the alteration of the score state shown at FIG. 15, as shown at line 1550. One item of note here, referring to FIG. 15, is that the weighting factor is a negative value, here, '−2'. This caused the neg phase value 135*b* for the 'Define' phase to be added, resulting in a value of '−2', and caused the value of '−2' to be added to the net define score 125*b*, for a resulting net phase score for the define phase 125*b* to become '0.' This negative weighting value of '−2' was also added to the current call score 145, resulting in a reduction of the current call score from a value of '5' to a value of '3'. The negative define phase score 135*b* would indicate to the agent that a keyword/keyphrase was identified that is not desired.

Though they won't be discussed in detail, the remaining keywords of FIG. 11 are assumed to have been identified in the order they are shown in FIG. 11 during the client interaction. This results in the addition of lines 1360-1390 of the exemplary call log file of FIG. 13, the addition of respective lines 1460-1490 to the array of FIG. 14, and the alteration of the call scores as shown in respective lines 1560-1590, used to display phase scores and call scores that are displayed on the GUI 100.

FIG. 16 provides an exemplary GUI that may be provided resulting from the keywords being identified as indicated in the call log file of FIG. 13, in accordance with an embodiment of the application. The GUI is shown as the GUI 100 of FIGS. 1-3, that is populated with the keyword list 210 generated from the array of FIG. 14, along with the current call score information provided, as represented from the line 1590 of the call scores shown in FIG. 15. In this case, the current keyword, shown at line 1490 of FIG. 14, is displayed at keyword 105 as "thank you for choosing", with the current keyword category 110 from line 1490 as "<Category X>" (representing the category associated with "thank you for choosing"). As discussed above, line 1590 represents values of the variable portion 610 of FIG. 6, for the respective call phase variables and the current call score variable. The daily high score of FIG. 16 indicates that the agent had a daily high call score of 57, and all time high score of 155. The daily high call and all time high scores may be retrieved from, for example, the call scores file of call scores portion 630 shown in FIG. 6, or may be provided by the memory structure 843 of FIG. 8 or the memory 1012 of FIG. 10. Further, as shown in FIG. 16, the agent has expanded the keyword list 210 by selecting the keyword expansion button 140. This resulted in the keyword list 210 being populated from the information stored in the array of FIG. 14. In an alternate embodiment discussed above with respect to FIG. 9, where all keyword and associated keyword information is provided in the transmission message, the most recent transmission message may be utilized to populate the keyword list 210.

The above embodiments have described keywords and keyword phrases as being identified from an agent channel of a client interaction (i.e., from the agents speech). The above systems and flowcharts could be employed as well to a client channel of the client interaction. For example, the keyword databases may have specific portions dedicated to keywords to be identified within the client channel, for one or more phases of the call. In the alternative, a separate client database may be provided listing only client channel keywords, such that the CIC server may identify two client databases for a client communication at step 1230, for the agent channel and one for the client channel. Identifying client channel keywords and transmission of the same may occur in a similar fashion as discussed above at step 950 and step 1255 for the agent channel.

The client channel may be represented in the GUI, for example, by including keywords in the client channel in the phase scores, i.e., 125*a*-125*e*, and the current call score 145. Instead, or in addition, the client channel identified keywords may be represented at the GUI through inclusion in the current keyword/category portions 105, 110 of the GUI 100, and/or as part of the Keyword list 210. A second GUI similar to GUI 100 may also be utilized and displayed adjacent the GUI 100, where each GUI 100 displays call score information for its respective channel (i.e., agent channel or client channel) of the client interaction. The client channel keywords may also be color-coded, for example, as a single color dedicated to client channel keywords, or by phase in a similar fashion as for the agent channel keywords. The client channel keywords may also be identified in the phase scores, i.e., 125*a*-125*e*, and the current call score 145.

In some embodiments, the phases may be provided in the GUI in a logical order/sequence that would typically occur during a client interaction. For example, such an order may include the order shown in FIG. 1, as "Learn", "Define", "Assess", "Buy", "Post Buy." Other phase ordering may be utilized. In addition, it has been described that the weighting factors may be progressive in nature, increasing for each interaction phase. In some embodiments, such call phase order and/or weighting factor values for each phase may be consistent among implementations of the agent application GUI, thereby providing agents a logical conformity/uniformity and/or consistency in the application instances. For example, the phase order and/or weighting factor values may be consistent and displayed in a similar fashion between implementations of the agent application. In this example embodiment, a consistent sensory experience is provided for agents utilizing the application, and may assist in aligning agent behavior, when using the application for various clients and/or instances of the application. This may reduce the chance of misinterpreting the information being provided by the GUI for any particular client or interaction, and reduce training time required for using the application between clients.

Though the subscription property changed events have been described as being used to provide the information for the current keyword and keyword associated information identified during a client interaction, the subscription event may instead provide information for the entire call. For example, the call log of the call log database 1015 may thus be used to populate the subscription event message that includes all keywords and keyword associated information for the interaction. When received at the agent station, the agent application may utilize only the most recent (current) identified keyword and associated keyword information from the message and operate as described above for populating the array of FIG. 14. In the alternative, the array of FIG. 14 may be completely repopulated each time a keyword is identified, with the information provided through the subscription event message.

Though the application has discussed the use of subscription property attribute changed events as a trigger and way of transmitting information to the agent workstation for processing and displaying by the agent application, other messages may be employed. Thus, event indicating as call initiation, keyword identification and call termination, as well as information transmission of keywords and keyword associated information, may occur using other message formats and/or data packet configurations, account for the various APIs and other communications protocols utilized within the system employing the agent application to provide a GUI like the GUI 100.

The agent station and server have been discussed above showing the agent processor and server processor sending or receiving communications, for example, the transmission message 480 and client interaction 485. It will be appreciated that the application workstation and server may each include an appropriate network interface or adapter, for communicating with other components or devices through different types of networks, such as the Internet, PSTN, LANs, WANs, MPLS, etc.

The communications bus structures discussed herein may be memory, processor, or communications bus structures. Such bus structures may be, for example, any of an Industry Standards Architecture (ISA) bus, a Micro Channel Architecture (MCA) bus, an Enhanced ISA (EISA) bus, and a Peripheral Component Interconnects (PCI) architecture bus, or any other bus architecture appropriate for performing the functions set forth herein.

The agent application has been described as being implemented as a WPF application, utilizing a C# code base that runs as a stand-alone application on the agent station. The agent application may be instead be carried out in other languages, including one or more of object oriented languages such as JAVA, C++, conventional procedural languages like C, scripting languages such as Pearl and VBS, functional languages such as Lisp and ML, and/or logic oriented languages such as Prolog.

In some embodiments, the information displayed by the agent application may be provided at the GUI in a different order, format and/or configuration, while still providing at least some of the advantages described herein. Thus, the application should not be limited by the arrangement or configuration of the GUI 100 discussed above with respect to FIGS. 1-4, 8 and 16.

Systems, methods and non-transitive computer readable medium have been described for assisting an agent during a client communication. Such systems, methods and non-transitory computer readable medium allow for the assisting of an agent during a client communication, substantially in real time while the client interaction is occurring. The agent application allows for providing a GUI, such as the GUI 100, to be built and updated, thereby allowing an agent to have an indication as to how the client interaction is progressing in real time or near real time. An agent may examine the scores for the various phases to determine if it would be beneficial to revisit a particular phase(s) of the interaction to collect further data to assist the client. Further, where a client asks questions or otherwise directs a call to a different interaction phase or topic not currently being explored by the agent, the agent may address the client's question or concern even if it would not be the next topic normally discussed, or if it revisits a prior topic or phase already discussed. Information addressing the client question or concern would be updated within the GUI by the agent application, allowing the agent to again reassess from the GUI which phase and/or topics should be addressed in the interaction after addressing the client's question or concern.

If the agent utilizes keywords or phrases that are not encouraged (i.e., are associated with a negative weighting factor), the negative score display for the phase as well as the current keyword information provides nearly instant feedback to the agent, thereby reinforcing agent behavior to avoid the keyword or phrase in the future.

Information, including keyword, category, and/or phase score is provided as part of a single, readily accessible and intuitive GUI. Thus, unlike conventional computer programs, where the agent would be required to scroll through and scan screens of information to make a determination about the status of the client interaction, and which topics to visit or revisit, the GUI disclosed herein would allow the agent to make the determinations in a quick fashion, as the pertinent information such as keywords and associated information is provided and easily accessible and observable through the provided GUI. Thus, unlike conventional computer programs where the agent may have needed uncomfortably long pauses to attempt to ascertain information from previous program screens, and likely would miss important information that would have been valuable in assisting the client, the present system employing the agent application that provides the GUI allows the agent to address the client's needs and questions even if off-topic or off-phase, while readily reassessing the state of the client interaction. Thus, using the system, agent application and the GUI described herein, the agent may quickly get back on track to determining further important issues and topics that need addressing in order to serve the client's needs. In addition, the complexity of determining the various keywords identified during the interaction, and maintaining an indication as to how complete the various call phases have been addressed through use of the phase scoring, would be prohibitive for the agent to maintain during the client interaction without the use of the system, agent application and GUI discussed herein, especially as the interaction continues for a significant time.

Further, there may be certain legal requirements that need be addressed during a client interaction, for example, a need to state that the conversation is being recorded, and to provide certain disclosures at the beginning of an interaction and/or for products being discussed during the interaction. In some embodiments, the agent application may include/ represent such legal requirements as certain keyword/keyphrase within the keyword lists being detected and displayed at the GUI. The agent may then utilize the GUI and/or the keyword list provided thereby to determine whether such requirements have been met. In this way, the agent application and the GUI provided thereby may help to mitigate legal risks of a client interaction.

It will be readily understood that the components of the application, as generally described and illustrated in the figures herein, may be arranged and designed in a wide variety of different configurations. Thus, the detailed description of the embodiments provided is not intended to limit the scope of the application as claimed, but is merely representative of the selected embodiments of the application.

One skilled in the art will realize that the above may be practiced with steps in a different order, and/or with hardware elements in configurations that are different than those that are disclosed. Therefore, though the application has been described based upon the above disclosed embodiments, it will be apparent to one skilled in the art that certain modifications, variations, and alternative constructions would be apparent.

We claim:

1. A computing system for assisting an agent during a client interaction between the agent and a client over a voice communications channel, the computing system comprising:

an agent station having an agent processor configured to:
  generate a graphic user interface of the client interaction on an agent display during the client interaction, the graphic user interface to display a current identified keyword and interaction phrase having a current phase score for the client interaction;
  receive a keyword and associated keyword information from the client interaction, the associated keyword information including an associated interaction phase and a corresponding phase score; and
  update, during the client interaction, the graphic user interface to replace the current identified keyword with the received keyword, and to replace the current phase score with the phase score corresponding to the received associated interaction phase.

2. The computing system of claim 1 where the voice communications channel is routed through a server, and wherein the server further comprises a server processor configured to:
  determine a client keyword set including a plurality of keywords and associated keyword information;
  provide voice recognition of a client channel and of a client channel of the client interaction;
  identify the received keyword from the determined client keyword set based on the voice recognition of the client channel;
  determine the associated interaction phase and a weighting factor for the received keyword;
  determine the corresponding current phase score based on the weighting factor; and
  communicate, during the client interaction, the received keyword and the associated keyword information, including the associated interaction phase and the corresponding current phase score, to the agent station.

3. The computing system of claim 2, wherein, when the server processor is configured to identify a utilized keyword, the server processor further is to:
  identify the received keyword from the determined client keyword set based on the voice recognition of the agent channel.

4. The computing system of claim 2, wherein the agent processor is further configured to:
  display, during the client interaction, all keyword and associated keyword information for the client interaction in a keyword list portion of the graphic user interface during the client interaction.

5. The computing system of claim 2, wherein the agent processor is further configured to:
  display, by the graphic user interface, a positive phase score and a negative phase score for the associated interaction phase, and
  where the server processor is configured to:
    determine a positive phase score corresponding to the associated interaction phase based on the weighting factor, where the weighting factor has a positive value,
    determine a negative phase score corresponding to the associated interaction phase based on the weighting factor, where the weighting factor has a negative value,
    communicate the corresponding positive phase score and the corresponding negative phase score for the associated interaction phase, and wherein the agent processor is configured to:
    display, by the graphic user interface, an updated positive phase score and an updated negative phase score corresponding to the received associated interaction phase.

6. The computing system of claim 1, wherein the keyword is a keyword phrase.

7. The computing system of claim 1, wherein the associated keyword information further includes a weighting factor, and
  wherein the agent processor is configured to:
    display the current identified keyword in a first color when the weighting factor has a positive value, and
    display the current identified keyword in a second color, different than the first color, when the weighting factor has a negative value.

8. A method of assisting an agent during a client interaction over a communications channel, the method comprising:
  providing, by an agent display of an agent station, a graphic user interface displaying a current identified keyword and an interaction phase having a current phase score for the client interaction;
  receiving, by the agent station a keyword and associated keyword information, the associated keyword information including an associated interaction phase and an associated current phase score; and
  updating, during the client interaction, the graphic user interface to replace the current identified keyword with the received keyword, and to replace the current phase score with the phase score corresponding to the received associated interaction phase.

9. The method of claim 8, further comprising:
  routing the client a server, the method and further comprising:
    determining a client keyword set including a plurality of keywords and associated keyword information;
    providing voice recognition of a client channel and of a client channel of the client interaction;
    identifying the received keyword from the determined client keyword set based on the voice recognition of the client channel;
    determining the associated interaction phase and a weighting factor for the received keyword;
    determining the corresponding current phase score based on the weighting factor; and
    communicating, during the client interaction, the received keyword and the associated keyword information, including the associated interaction phase and the corresponding current phase score, to the agent station.

10. The method of claim 9, further comprising:
  subscribing, by the agent station, to a property change event associated with the client interaction,
  wherein the server, upon detecting the property change event, communicates the received keyword and the received associated keyword information to the agent station.

11. The method of claim 9, wherein the identifying the received key word further comprises:
  identifying the received keyword from the determined client keyword set based on the voice recognition of the agent channel.

12. The method of claim 9, wherein the determining the client keyword set comprises:
  determining the client keyword set using one or more of a client identification code and a caller identification notification received during the client interaction.

13. The method of claim 9, wherein the providing the graphic user interface further comprises:
 displaying, during the client interaction, all keyword and associated keyword information for the client interaction in a keyword list portion.

14. The method of claim 9, wherein the providing the graphic user interface further comprises:
 displaying a current call score, a daily high call score, and an all-time high score,
 where the current call score, the daily high call score, and the all-time high score are determined based on the weighting factor.

15. The method of claim 9, wherein the providing the graphic user Interface further comprises:
 includes displaying a positive phase score and a negative phase score for the associated interaction phase;
 determining a positive phase score corresponding to the associated interaction phase based on the weighting factor, where the weighting factor has a positive value;
 determining a negative phase score corresponding to the associated interaction phase based on the weighting factor, where the weighting factor has a negative value; and
 display an updated positive phase score and an updated negative phase score corresponding to the received associated interaction phase.

16. The method of claim 8, wherein the providing the graphic user interface further comprises:
 displaying a current keyword category associated with the current identified keyword, and
 where the receiving the associated keyword information includes receiving a received keyword category, and
 where the updating the graphic user interface includes updating the current keyword with the received keyword category.

17. The method of claim 8, wherein the keyword is a keyword phrase.

18. A non-transitory computer readable medium storing program instructions that when executed by a computer cause the computer to perform:
 providing, by an agent display of an agent station, a graphic user interface displaying a current identified keyword and an interaction phase having a current phase score for the client interaction;
 receiving, by the agent station a keyword and associated keyword information, the associated keyword information including an associated interaction phase and an associated current phase score; and
 updating, during the client interaction, the graphic user interface to replace the current identified keyword with the received keyword, and to replace the current phase score with the phase score corresponding to the received associated interaction phase.

19. The non-transitory computer readable medium of claim 18, where the program instruction cause the computer to perform:
 displaying, by the graphic user interface during the client interaction, all keyword and associated keyword information for the client interaction in a keyword list portion.

20. The non-transitory computer readable medium of claim 18, where the program instruction cause the computer to perform:
 displaying, by the graphic user interface, a current call score, a daily high call score, and an all-time high score; and
 updating the graphic user interface including updating the current call score, the daily high call score, and the all-time high score of the graphic user interface.

\* \* \* \* \*